United States Patent
Cheng et al.

(10) Patent No.: US 11,758,445 B2
(45) Date of Patent: Sep. 12, 2023

(54) CONFIGURATION FOR ACQUISITION OF RELAY CELLS

(71) Applicant: QUALCOMM Incorporated, San Diego, CA (US)

(72) Inventors: Hong Cheng, Bridgewater, NJ (US); Haris Zisimopoulos, London (GB); Lenaig Genevieve Chaponniere, La Jolla, CA (US); Karl Georg Hampel, Hoboken, NJ (US); Sebastian Speicher, Wallisellen (CH); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/020,773

(22) Filed: Sep. 14, 2020

(65) Prior Publication Data
US 2021/0084547 A1   Mar. 18, 2021

Related U.S. Application Data

(60) Provisional application No. 62/900,947, filed on Sep. 16, 2019.

(51) Int. Cl.
| | | |
|---|---|---|
| *H04W 36/00* | (2009.01) | |
| *H04W 36/08* | (2009.01) | |
| *H04B 7/155* | (2006.01) | |
| *H04W 60/00* | (2009.01) | |

(Continued)

(52) U.S. Cl.
CPC ........ *H04W 36/0061* (2013.01); *H04B 7/155* (2013.01); *H04W 4/40* (2018.02); *H04W 36/08* (2013.01); *H04W 36/32* (2013.01); *H04W 60/00* (2013.01)

(58) Field of Classification Search
CPC ... H04W 36/0061; H04W 4/40; H04W 36/08; H04W 36/32; H04W 60/00; H04W 84/005; H04W 88/04; H04W 48/16; H04W 4/029; H04W 4/46; H04W 36/00835; H04B 7/155; H04B 7/15507; H04L 67/12
See application file for complete search history.

(56) References Cited

U.S. PATENT DOCUMENTS

| | | | | |
|---|---|---|---|---|
| 11,272,422 | B2 * | 3/2022 | Reimann | H04W 76/14 |
| 2012/0252354 | A1 * | 10/2012 | Itoh | H04W 48/16 |
| | | | | 455/7 |
| 2015/0156708 | A1 | 6/2015 | Tietz et al. | |

(Continued)

FOREIGN PATENT DOCUMENTS

EP    2541990 A1    1/2013

OTHER PUBLICATIONS

International Search Report and Written Opinion—PCT/US2020/050911—ISA/EPO—dated Nov. 16, 2020.

*Primary Examiner* — Marisol Figueroa
(74) *Attorney, Agent, or Firm* — Muncy, Geissler, Olds and Lowe

(57) ABSTRACT

Disclosed are apparatuses and techniques for wireless communications. In an aspect, path information from a plurality of relays is received at a server. A relay cell list for an area of interest is compiled based on the received path information from the plurality of relays. The relay cell list is provided to a user equipment (UE). The UE can use the relay list to assist in the search and/or selection of relays in the wireless communications network.

21 Claims, 16 Drawing Sheets

(51) Int. Cl.
*H04W 4/40* (2018.01)
*H04W 36/32* (2009.01)

(56) References Cited

U.S. PATENT DOCUMENTS

| | | | |
|---|---|---|---|
| 2015/0296350 A1* | 10/2015 | Chu | H04L 67/303 370/312 |
| 2019/0274017 A1 | 9/2019 | Wang et al. | |
| 2020/0229065 A1* | 7/2020 | Iwata | H04W 40/20 |

* cited by examiner

CONFIGURATION FOR ACQUISITION OF RELAY CELLS

CROSS-REFERENCE TO RELATED APPLICATIONS

The present application for patent claims the benefit of U.S. Provisional Application No. 62/900,947, entitled "CONFIGURATION FOR ACQUISITION OF RELAY CELLS," filed Sep. 16, 2019, assigned to the assignee hereof, and expressly incorporated herein by reference in its entirety.

INTRODUCTION

Various aspects described herein generally relate to wireless communication systems, and more particularly, to wireless communication systems having relays that provide network access to user equipment (UE) and improved UE acquisition of the relay cells.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard, also referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor, for example. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

In existing macro networks, e.g. traditional 4G/5G deployments including evolved NodeB (eNB), an NR general Node B (gNodeB, gNB), the eNBs/gNBs are fixed, consequently the list of neighbors eNBs/gNBs that a user equipment (UE) is expected to see (and potentially be handed over to) when camped on a particular eNB/gNB is known and fixed. As a result, in conventional 4G networks no explicit neighbor list is provided to the UE in idle mode.

However, in fleet systems, where relays providing service to the UEs may be moving, and thus the list of neighboring relays that the UE is expected to see while camped on a particular relay can be changing. If the UE in idle mode always selects the best cell based on the UEs scanning, as in traditional network solutions, the UE will have to perform very frequent reselections. Consequently a neighbor list in idle mode is more useful in the fleet system or other systems that use relays for connectivity to UE than in traditional wireless networks, to reduce the number of reselections. In connected mode, as in traditional wireless networks, an up-to-date neighbor list is used to ensure successful handovers. Hence there is a need to dynamically update the neighbor lists sent to the UE, based on the UEs location and the relays location.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

At least one aspect includes a method of wireless communication including: receiving path information from a plurality of relays, compiling a relay cell list for an area of interest based on the received path information from the plurality of relays, and providing the relay cell list to a user equipment (UE).

At least one other aspect includes a path server including: at least one processor coupled to a memory, the at least one processor configured to: receive path information from a plurality of relays; compile a relay cell list for an area of interest based on the received path information from the plurality of relays, and to provide the relay cell list to a user equipment (UE).

At least one other aspect includes a method at a user equipment (UE) including: accessing a relay cell list for an area of interest, where the relay cell list is based on path information from a plurality of relays. The method also includes searching for a relay based on information contained in the relay cell list. The method also includes selecting the relay based on information contained in the relay cell list.

At least one other aspect includes a user equipment (UE) including: at least one processor coupled to a memory, the at least one processor configured to: access a relay cell list for an area of interest, where the relay cell list is based on path information from a plurality of relays; search for a relay based on information contained in the relay cell list; and select the relay based on information contained in the relay cell list.

At least one other aspect includes a method at a relay including: determining path information for the relay, where the path information includes a plurality of geographic locations and associated times with a corresponding relay cell operation configuration. The method also includes providing the path information for the relay to a path server.

At least one other aspect includes a relay including: at least one processor coupled to a memory, the at least one processor configured to: determine path information for the relay, where the path information includes a plurality of geographic locations and associated times with a corresponding relay cell operation configuration and to provide the path information for the relay to a path server.

At least one other aspect includes an apparatus including: means for receiving path information from a plurality of relays, means for compiling a relay cell list for an area of interest based on the received path information from the plurality of relays, and means for providing the relay cell list to a user equipment (UE).

At least one other aspect includes a non-transitory computer-readable medium storing computer-executable instructions for wireless communication at a path server, the computer-executable instructions including: at least one instruction to receive path information from a plurality of relays; at least one instruction to compile a relay cell list for an area of interest based on the received path information from the plurality of relays; and at least one instruction to provide the relay cell list to a user equipment (UE).

At least one other aspect includes an apparatus including: means for accessing a relay cell list for an area of interest, where the relay cell list is based on path information from a plurality of relays; means for searching for a relay based on information contained in the relay cell list; means for selecting the relay based on information contained in the relay cell list.

At least one other aspect includes a non-transitory computer-readable medium storing computer-executable instructions for wireless communication at a user equipment (UE), the computer-executable instructions including: at least one instruction to access a relay cell list for an area of interest, where the relay cell list is based on path information from a plurality of relays; at least one instruction to search for a relay based on information contained in the relay cell list; and at least one instruction to select the relay based on information contained in the relay cell list.

At least one other aspect includes an apparatus including: means for determining path information for the relay, where the path information includes a plurality of geographic locations and associated times with a corresponding relay cell operation configuration; and means for providing the path information for the relay to a path server.

At least one other aspect includes a non-transitory computer-readable medium storing computer-executable instructions for wireless communication at relay, the computer-executable instructions including: at least one instruction to determine path information for the relay, where the path information includes a plurality of geographic locations and associated times with a corresponding relay cell operation configuration; and at least one instruction to provide the path information for the relay to a path server.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
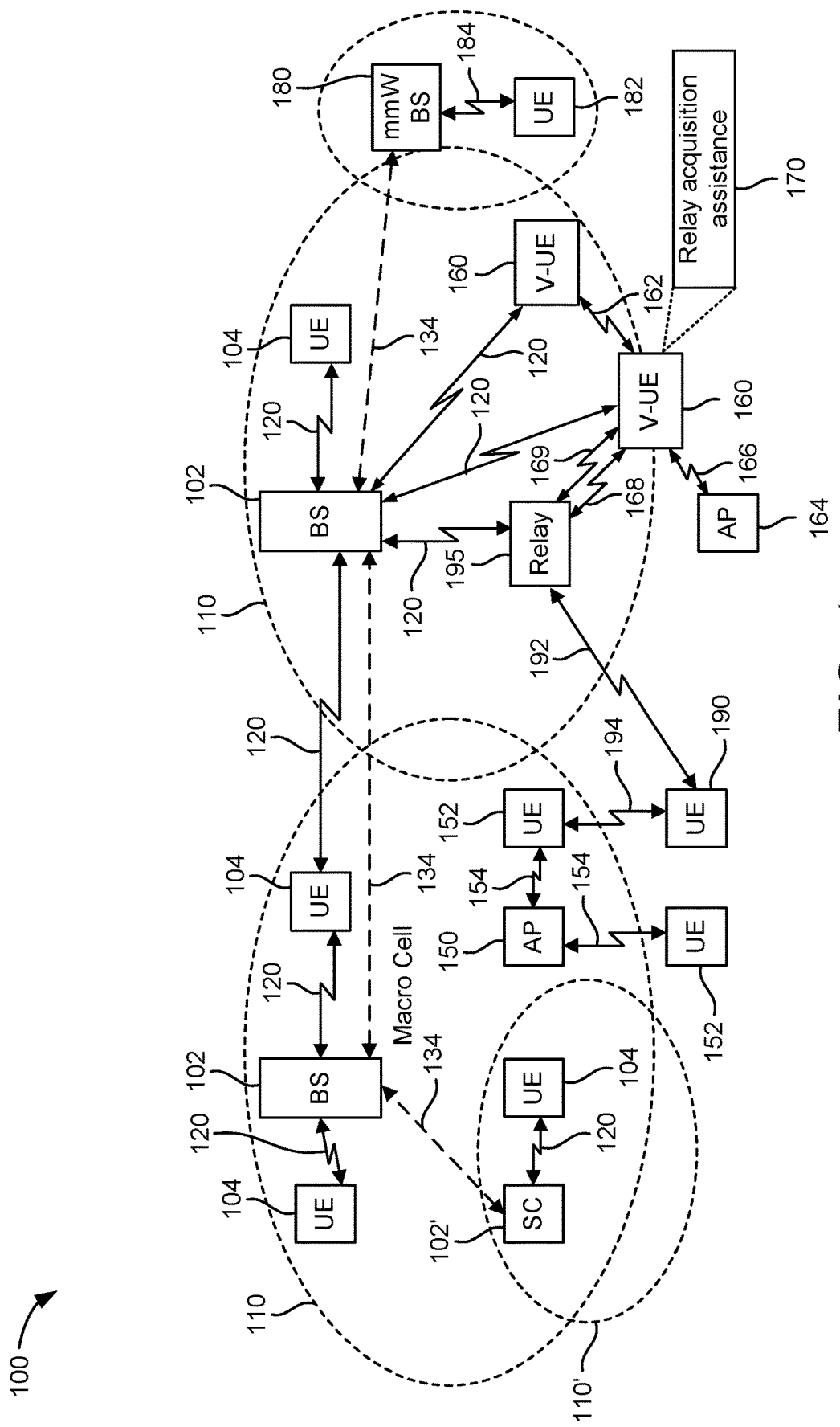
FIG. 1 illustrates an exemplary wireless communications system in accordance with one or more aspects of the disclosure.

Disclosed are techniques for UE configuration for acquisition of relay cells in wireless communications networks having mobile relays that provide access to the network. In various aspects, path information from each of the mobile relays is provided to a path server. The path server can compile this path information it relay cell lists for specific areas of interest (e.g., portion of the wireless communications system) where the relays are expected to be at a particular time. This information can be provided to the UE in a given area of interest to facilitate search, selection and/or connection to the relays. It will be appreciated due to the mobility of the relays, that providing information on relays that are or expected to be in the area of interest assists the UE in the acquisition a relay for access to the network. As discussed herein, a relay may include the various components and functionalities of a base station from the perspective of a UE being served by the relay. Likewise, the relay may also include various components and functionalities related to the UE from the perspective of a base station serving the relay.

These and other aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "UE," "vehicle UE" (V-UE), and "base station" are not intended to be specific or otherwise limited to any particular radio access technology (RAT), unless otherwise noted. In general, such UEs may be any wireless communication device (e.g., a vehicle onboard computer, a vehicle navigation device, a mobile phone, a router, a tablet computer, a laptop computer, a tracking device, an Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. A V-UE may be any in-vehicle wireless communication device, such as a vehicle onboard computer, a navigation system, a warning system, a heads-up display (HUD), etc. Alternatively, a V-UE may be a portable wireless communication device (e.g., a cell phone, tablet computer, etc.) that belongs to the driver of the vehicle or a passenger in the vehicle. The term "V-UE" may refer to the in-vehicle wireless communication device or the vehicle itself, depending on the context. Generally, UEs can communicate with a core network via a RAN, and through the core network the UEs can be connected with external networks, such as, the Internet and with other UEs. Of course, other mechanisms of connecting to the core network and/or the Internet are also possible for the UEs, such as, over wired access networks, WiFi networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an LTE network, gNodeBs (gNBs) where the wireless communications system 100 corresponds to a 5G network, and/or a combination thereof, and the small cells may include femtocells, picocells, microcells, etc.

The base stations 102 may collectively form a RAN and interface with an evolved packet core (EPC) or next generation core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), evolved multimedia broadcast multicast services (eMBMS), 5G multicast broadcast services (MBS) subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102.

The term "cell" refers to a logical communication entity used for communication with a base station 102 (e.g., over a carrier frequency), and may be associated with an identifier for distinguishing neighboring cells (e.g., a physical cell ID (PCI), an enhanced cell identifier (E-CID), a virtual cell identifier (VCID), etc.) operating via the same or a different carrier frequency. In some examples, a carrier frequency may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNodeBs, which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 gigahertz (GHz)). When communicating in an unlicensed frequency spectrum, the UEs 152 (WLAN STAs) and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with 'UE 152, a WLAN STA, connected to the WLAN AP 150 (through which UE 190 may indirectly obtain WLAN-based Internet connectivity). In an example, the D2D P2P links 192-194 may be supported with any well-known D2D RAT, such as LTE Direct (LTE-D), WiFi Direct (WiFi-D), Bluetooth, and so on.

Leveraging the increased data rates and decreased latency of 5G, among other things, Vehicle-to-Everything (V2X) communication technologies are being implemented to support Intelligent Transportation Systems (ITS) applications, such as wireless communications between vehicles (Vehicle-to-Vehicle (V2V)), between vehicles and the roadside infrastructure (Vehicle-to-Infrastructure (V2I)), and between vehicles and pedestrians (Vehicle-to-Pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless unicast sidelink 162, with a roadside access point 164 over a sidelink 166, or with relay 195 over a Uu interface 169 and/or a sidelink 168 using P2P/D2D protocols (e.g., "PC5," an LTE V2X D2D interface) or ProSe direct communications. sidelink communication may be used for D2D media-sharing, V2V communication, V2X communication (e.g., cellular V2X (cV2X) communication, enhanced V2X (eV2X) communication, etc.), emergency rescue applications, etc. One or more of a group of V-UEs 160 utilizing D2D communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via D2D communications may utilize a one-to-many (1:M) system in which each V-UE 160 transmits to every other V-UE 160 in the group. In some cases, a base station 102 facilitates the scheduling of resources for D2D communications. In other cases, D2D communications are carried out between V-UEs 160 without the involvement of a base station 102.

In an aspect, the V-UEs 160, and any other UE illustrated in FIG. 1, may have a relay acquisition assistance function also referred to herein as relay acquisition assistance module 170. The relay acquisition assistance module 170 may be a hardware, software, or firmware component that, when executed, causes the V-UE 160 to perform the operations described herein. For example, the relay acquisition assistance module 170 may be a software module stored in a memory of the V-UE 160 and executable by a processor of the V-UE 160. As another example, the relay acquisition assistance module 170 may be a hardware circuit (e.g., an ASIC, a field programmable gate array (FPGA), etc.) within the V-UE 160.

In an aspect, the wireless sidelinks 162, 166, 168 may operate over a communication medium of interest, which may be shared with other communications between other vehicles and/or infrastructure access points, as well as other RATs. A "medium" may be composed of one or more frequency, time, and/or space communication resources (e.g., encompassing one or more channels across one or more carriers) associated with communication between one or more transmitter/receiver pairs.

In an aspect, the wireless sidelinks 162, 166, 168 may be cV2X links. A first generation of cV2X has been standardized in LTE, and the next generation is expected to be defined in 5G (also referred to as "New Radio" (NR) or "5G NR"). cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the wireless sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of code division multiple access (CDMA) systems, time division multiple access (TDMA) systems, frequency division multiple access (FDMA) systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more P-UEs 104 are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a P-UE 104 may include information about, for example, the position, speed, acceleration, and heading of the V-UE 160 and the position, speed (e.g., where the P-UE 104 is a bicycle), and heading of the P-UE 104.

Figure 2A:
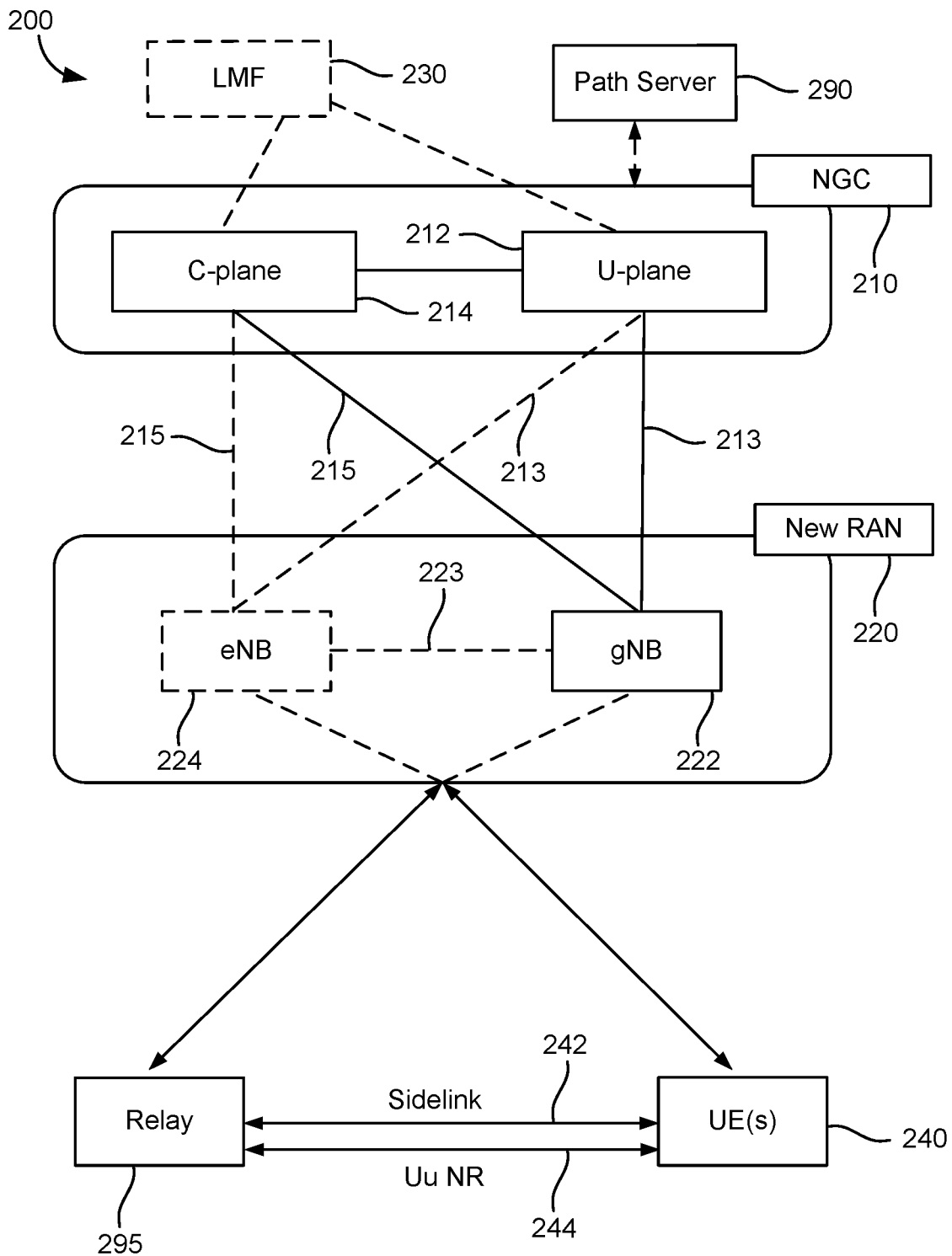
FIGS. 2A and 2B illustrate example wireless network structures, according to various aspects.

FIG. 2A illustrates an example wireless network 200 according to one or more aspects. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) that operate cooperatively to form the core network. User plane interface (NG-U) 213 and control plane interface (NG-C) 215 connect one or more gNBs 222 to the NGC 210 and specifically to the control plane functions 214 and user plane functions 212. In an additional configuration, one or more eNBs 224 may also be connected to the NGC 210 via NG-C 215 to the control plane functions 214 and NG-U 213 to user plane functions 212. Further, eNB(s) 224 may directly communicate with gNB(s) 222 via a backhaul connection 223. Accordingly, in some configurations, the New RAN 220 may only have one or more gNBs 222, while other configurations include one or more of both eNBs 224 and gNBs 222. Either gNB(s) 222 or eNB(s) 224 may communicate with one or more UEs 240 (e.g., any of the UEs depicted in FIG. 1, such as UEs 104, UE 152, UE 160, UE 182, UE 190, etc.). Additionally, a relay 295 may communicate with EPC 260 via eNB(s) 224 or gNB(s) 222 configured as donor base stations, discussed in greater detail in the following. In an aspect, UE 240 may communicate with NGC 210 directly via eNB(s) 224 or gNB(s) 222. Alternatively or in addition to UE 240 may communicate to the network 200, via relay 295. The UE 240 may communicate to the relay 295 over a wireless unicast sidelink 242, which may correspond to wireless unicast sidelink 162 in FIG. 1 and/or may communicate over a Uu NR link 244, which is discussed in greater detail in the following disclosure.

The network 200 may include a path server 290 in communication with the NGC 210 to obtain relay path information from relay 295 and provide a relay cell list to assist the UE 240 in searching for and connecting to relay 295. The path server 290 can be implemented as single server or may be a plurality of structurally separate servers. Although FIG. 2A illustrates the path server 290 as separate from the NGC 210 and the New RAN 220, in some aspects, it may instead be integrated into one or more components of the NGC 210 or the New RAN 220. The functionality of the relay 295 and path server 290 will be discussed in greater detail starting in relation to FIG. 6A and in the following disclosure.

Another optional aspect may include a location management function (LMF) 230 in communication with the NGC 210 to provide location assistance for UEs 240. The LMF 230 determines, using information from the UE 240 and/or the New RAN 220, the current location of the UE 240 and provides it on request. The LMF 230 can be implemented as a plurality of structurally separate servers, or alternately may each correspond to a single server. Although FIG. 2A illustrates the LMF 230 as separate from the NGC 210 and the New RAN 220, it may instead be integrated into one or more components of the NGC 210 or the New RAN 220.

Figure 2B:
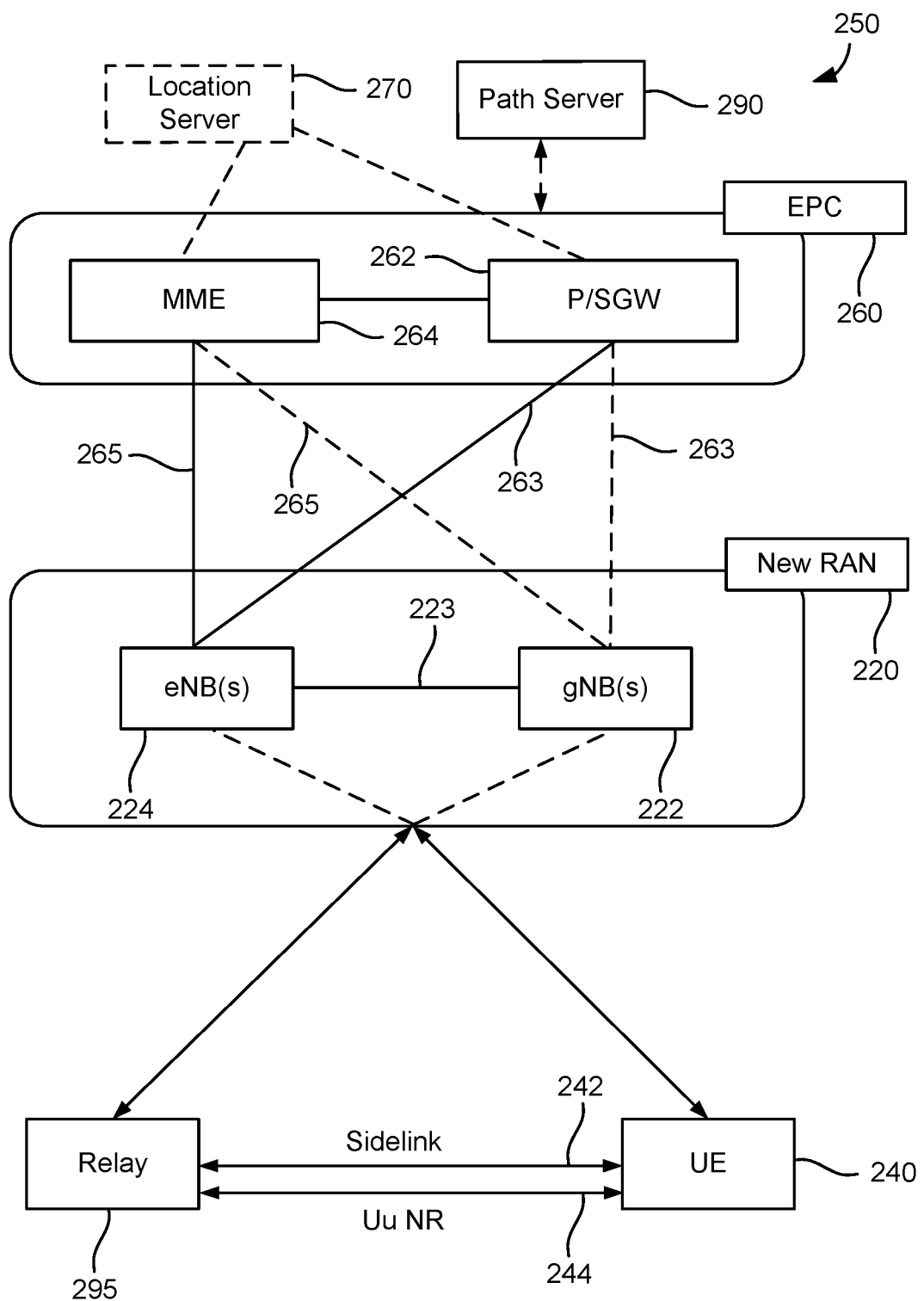

FIG. 2B illustrates an example wireless network structure 250 according to one or more aspects. For example, Evolved Packet Core (EPC) 260 can be viewed functionally as control plane functions, i.e., Mobility Management Entity (MME) 264, and user plane functions, i.e., Packet Data Network Gateway/Serving Gateway (P/SGW) 262, which operate cooperatively to form the core network. S1 control plane interface (S1-MME) 265 and 51 user plane interface (S1-U) 263 connect one or more eNBs 224 to the EPC 260, and specifically to MME 264 and P/SGW 262, respectively.

In an additional configuration, one or more gNBs 222 may also be connected to the EPC 260 via S1-MME 265 to MME 264 and S1-U 263 to P/SGW 262. Further, eNB(s) 224 may directly communicate with one or more gNBs 222 via the backhaul connection 223, with or without gNB direct connectivity to the EPC 260. Accordingly, in some configurations, the New RAN 220 may only have gNB(s) 222, while other configurations include both eNB(s) 224 and gNB(s) 222. Either gNB(s) 222 or eNB(s) 224 may communicate with one or more UEs 240 (e.g., any of the UEs depicted in FIG. 1, such as UEs 104, UE 182, UE 190, etc.). Additionally, a relay 295 may communicate with EPC 260 via eNB(s) 224 or gNB(s) 222 configured as donor base stations, discussed in greater detail in the following. In an aspect, UE 240 may communicate with EPC 260 directly via eNB(s) 224 or gNB(s) 222. Alternatively or in addition to UE 240 may communicate to the network 200, via relay 295. The UE 240 may communicate to the relay 295 over a wireless unicast sidelink 242, which may correspond to wireless unicast sidelink 162 in FIG. 1 and/or may communicate over a Uu NR link 244, which is discussed in greater detail in the following disclosure.

The network 250 may include a path server 290 in communication with the EPC 260 to obtain relay path information from relay 295 and provide a relay cell list to assist the UE 240 in searching for and connecting to relay 295. The path server 290 can be implemented as single server or may be a plurality of structurally separate servers. Although FIG. 2A illustrates the path server 290 as separate from the EPC 25 and the New RAN 220, in some aspects, it may instead be integrated into one or more components of the EPC 260 or the New RAN 220. The functionality of the relay 295 and path server 290 will be discussed in greater detail starting in relation to FIG. 6A and the following disclosure.

Another optional aspect may include a location server 270 that may be in communication with the EPC 260 to provide location assistance for UE(s) 240. In an aspect, the location server 270 may be an Evolved Serving Mobile Location Center (E-SMLC), a Secure User Plane Location (SUPL) Location Platform (SLP), a Gateway Mobile Location Center (GMLC), or the like. The location server 270 can be implemented as a plurality of structurally separate servers, or alternately may each correspond to a single server. The location server 270 can be configured to support one or more location services for UE(s) 240 that can connect to the location server 270 via the core network, EPC 260, and/or via the Internet (not illustrated).

Figure 3:
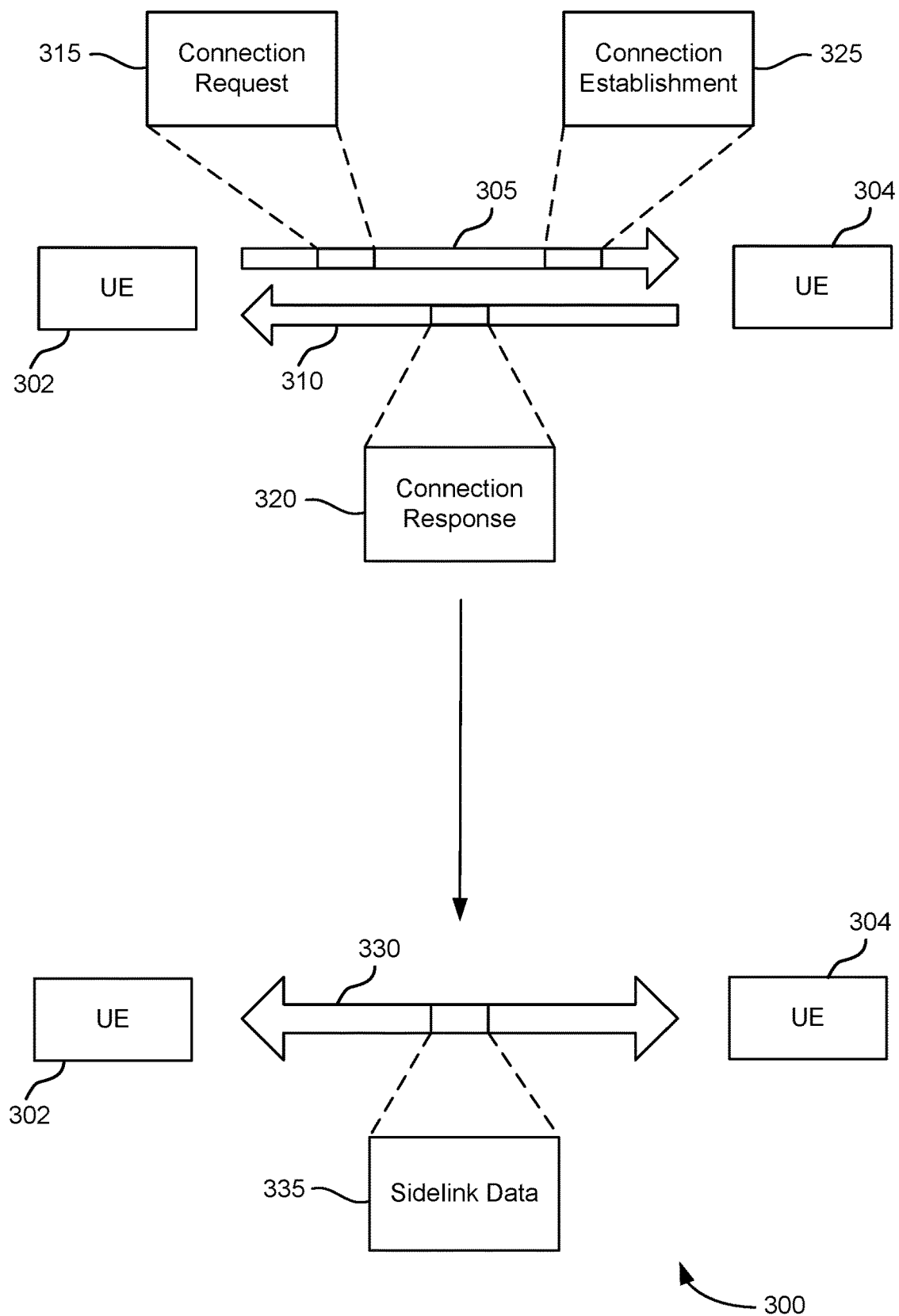
FIG. 3 illustrates an example of a wireless communications system that supports unicast sidelink establishment in accordance with aspects of the disclosure.

FIG. 3 illustrates an example wireless communications system 300 that supports unicast sidelink establishment in accordance with aspects of the disclosure. In some examples, wireless communications system 300 may implement aspects of wireless communications networks 100, 200, and 250. Wireless communications system 300 may include a first UE 302 and a second UE 304, which may be examples of any of the UEs depicted in FIG. 1, such as UEs 104, UE 152, UEs 160, UE 182, UE 190, etc., or the UEs 240 depicted in FIGS. 2A and 2B. A UE 302 may attempt to establish a unicast connection over a sidelink with UE 304, which may be a V2X communication link between UE 302 and UE 304. Additionally or alternatively, the unicast connection over the sidelink may generally be used for sidelink communications between any two UEs. Thus, the established sidelink connection may correspond to wireless sidelinks 162, 166, and/or 168 in FIG. 1 and/or wireless sidelink 242 in FIGS. 2A and 2B. It will be appreciated that relays disclosed herein (e.g., relay 195, 295, etc.) may be consider as UEs generally and are configured as a relay when they provide an operative link to provide communications from a donor base station or upstream relay to a UE or downstream relay. Accordingly, aspects of the sidelink (e.g., PC5) functionality described herein for the UEs are also applicable to the relays.

For establishing the unicast connection, access stratum (AS) (a functional layer in the UMTS and LTE protocol stacks between the RAN and the UE that is responsible for transporting data over wireless links and managing radio resources, also referred to as "Layer 2") parameters may be configured and negotiated between UE 302 and UE 304. For example, a transmission and reception capability matching may be negotiated between UE 302 and UE 304. Each UE may have different capabilities (e.g., transmission and reception capabilities, 64QAM, transmission diversity, carrier aggregation (CA) capabilities, supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (e.g., Integrity Protection). Security requirements may differ for different wireless communications systems. For example, V2X and Uu interfaces may have different security requirements (e.g., Uu security does not include confidentiality protection). Additionally, Internet protocol (IP) configurations (e.g., IP versions, addresses, etc.) may be negotiated for the unicast connection between UE 302 and UE 304.

In some cases, UE 304 may create a service announcement (e.g., a service capability message) to transmit over a cellular network (e.g., cV2X) to assist the unicast connection establishment. Conventionally, UE 302 may identify and locate candidates for unicast communications based on a basic service message (BSM) broadcasted unencrypted by nearby UEs (e.g., UE 304). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 302 is able to detect the BSM(s). Accordingly, the service announcement transmitted by UE 304 and other nearby UEs (e.g., a discovery signal) may be an upper layer signal and broadcasted (e.g., in a NR sidelink broadcast). In some cases, UE 304 may include one or more parameters for itself in the service announcement, including connection parameters and/or capabilities it possesses. UE 302 may then monitor for and receive the broadcasted service announcement to identify potential UEs for corresponding unicast connections. In some cases, UE 302 may identify the potential UEs based on the capabilities each UE indicates in their respective service announcements.

The service announcement may include information to assist UE 302 (e.g., or any initiating UE) to identify the UE transmitting the service announcement. For example, the service announcement may include channel information where direct communication requests may be sent. In some cases, the channel information may be specific to RAT (e.g., LTE or NR) and may include a resource pool that UE 302 transmits the communication request in. Additionally, the service announcement may include a specific destination address for the UE (e.g., a Layer 2 (L2) destination address) if the destination address is different from the current address (e.g., the address of the streaming provider or UE transmitting the service announcement). The service announcement may also include a network or transport layer for UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential unicast connection target (e.g., UE 304), UE 302 (e.g., the initiating UE) may transmit a connection request 315 to the identified target. In some cases, the connection request 315 may be a first RRC message transmitted by UE 302 to request a unicast connection with UE 304 (e.g., an RRCDirectConnectionSetupRequest message). For example, the unicast connection may utilize the PC5 interface for the unicast link, and the connection request 315 may be an RRC connection setup request message. Additionally, UE 302 may use a sidelink signaling radio bearer 305 to transport the connection request 315.

After receiving the connection request 315, UE 304 may determine whether to accept or reject the connection request 315. UE 304 may base this determination on a transmission/reception capability, an ability to accommodate the unicast connection over the sidelink, a particular service indicated for the unicast connection, the contents to be transmitted over the unicast connection, or a combination thereof. For example, if UE 302 wants to use a first RAT to transmit or receive data, but UE 304 does not support the first RAT, then UE 304 may reject the connection request 315. Additionally or alternatively, UE 304 may reject the connection request 315 based on being unable to accommodate the unicast connection over the sidelink due to a limited radio resource, a scheduling issue, etc. Accordingly, UE 304 may transmit an indication of whether the request is accepted or rejected in a connection response 320. Similar to UE 302 and the connection request 315, UE 304 may use a sidelink signaling radio bearer 310 to transport the connection response 320. Additionally, the connection response 320 may be a second RRC message transmitted by UE 304 in response to the connection request 315 (e.g., an RRCDirectConnectionResponse message).

In some cases, sidelink signaling radio bearers 305 and 310 may be a same sidelink radio signal bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 320 indicates that UE 304 accepted the connection request 315, UE 302 may then transmit a connection establishment 325 message on the sidelink signaling radio bearer 305 to indicate that the unicast connection setup is complete. In some cases, the connection establishment 325 may be a third RRC message (e.g., an RRCDirectConnectionSetupComplete message). Each of the connection request 315, the connection response 320, and the connection establishment 325 may use a basic capability when being transported from a UE to the other UE to enable each UE to be able to receive and decode a corresponding transmission (e.g., RRC message).

Additionally, identifiers may be used for each of the connection request 315, the connection response 320, and the connection establishment 325 (e.g., the RRC signaling). For example, the identifiers may indicate which UE 302/304 is transmitting which message and/or which UE 302/304 the message is intended for. For physical (PHY) channels, the RRC signaling and any subsequent data transmissions may use a same identifier (e.g., L2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a PHY layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, UE 302 and/or UE 304 may include RLC parameters when establishing the unicast connection to set an RLC context of the unicast connection. For example, the RLC context may indicate whether an AM (e.g., a reordering timer (t-reordering) is used) or an unacknowledged mode (UM) is used for the RLC layer of the unicast communications.

Additionally, UE 302 and/or UE 304 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, CA, or a combination thereof for the unicast connection. Additionally, UE 302 and/or UE 304 may include PHY layer parameters when establishing the unicast connection to set a PHY layer context for the unicast connection. For example, the PHY layer context may indicate a transmission format (unless transmission profiles are included for each UE) and a radio resource configuration (e.g., bandwidth part (BWP), numerology, etc.) for the unicast connection. These information elements may be supported for different frequency range configurations (e.g., frequency range 1 (FR1) for a sub-6 GHz frequency band, typically 450 MHz to 6000 MHz, and frequency range 2 (FR2) for mmW, typically 24250 MHz to 52600 MHz).

In some cases, a security context may also be set for the unicast connection (e.g., after the connection establishment 325 message is transmitted). Before a security association (e.g., security context) is established between UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established. As noted above, UE 304 may base its decision on whether to accept or reject the connection request 315 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, UE 302 and UE 304 may communicate using the unicast connection over a sidelink 330, where sidelink data 335 is transmitted between the two UEs 302 and 304. In some cases, the sidelink data 335 may include RRC messages transmitted between the two UEs 302 and 304. To maintain this unicast connection on sidelink 330, UE 302 and/or UE 304 may transmit a keep alive message (e.g., RRCDirectLinkAlive message, a fourth RRC message, etc.). In some cases, the keep alive message may be triggered periodically or on-demand (e.g., event-triggered). Accordingly, the triggering and transmission of the keep alive message may be invoked by UE 302 or by both UE 302 and UE 304. Additionally or alternatively, a MAC control element (CE) (e.g., defined over sidelink 330) may be used to monitor the status of the unicast connection on sidelink 330 and maintain the connection. When the unicast connection is no longer needed (e.g., UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4:
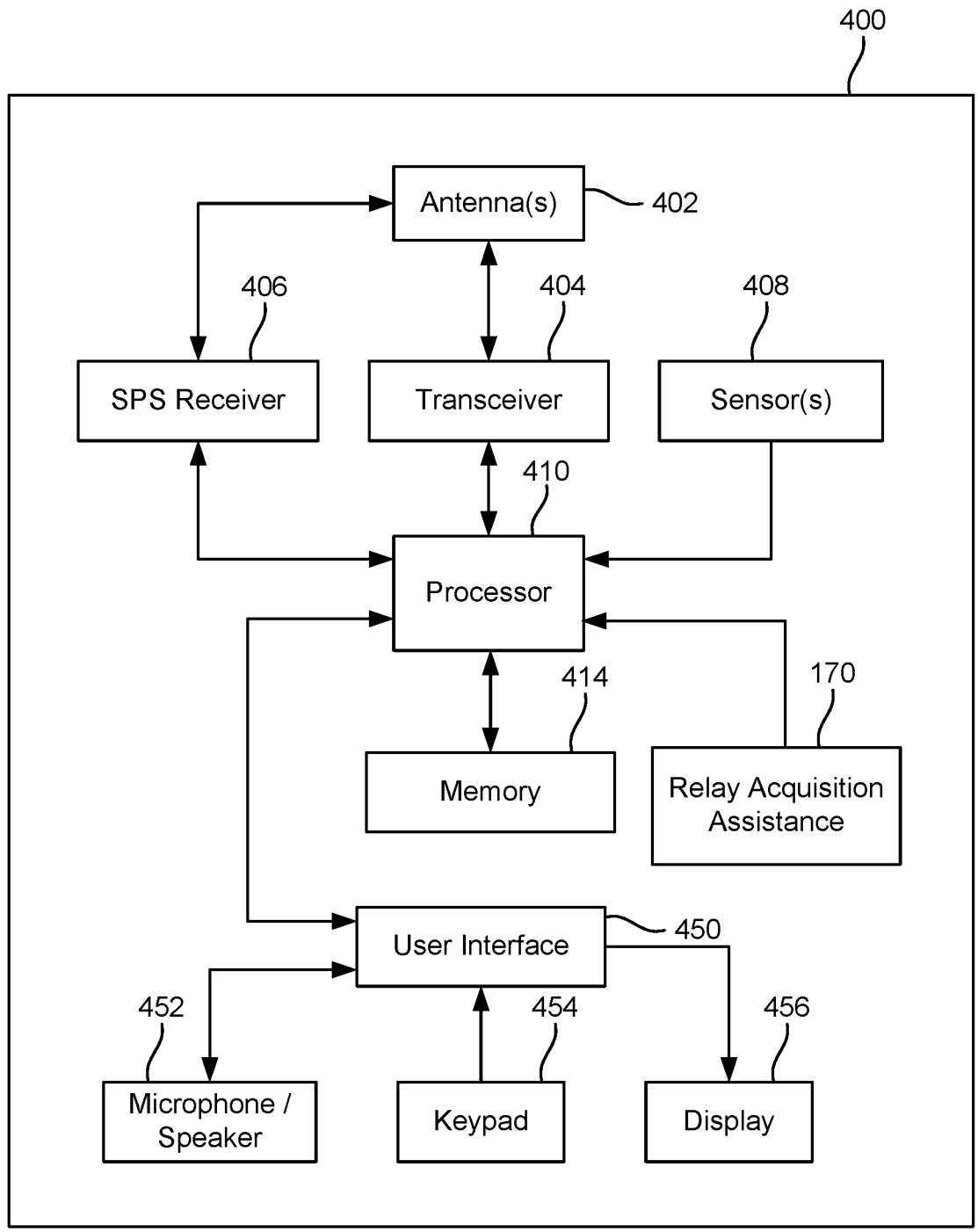
FIG. 4 is a block diagram illustrating various components of an exemplary UE according to at least one aspect of the disclosure.

FIG. 4 is a block diagram illustrating various components of an exemplary UE 400, according to aspects of the disclosure. In an aspect, the UE 400 may correspond to any of UEs 104, 152, 160, 182, 190 in FIG. 1, UEs 240 in FIGS. 2A and 2B, or UEs 302, 304 in FIG. 3. For the sake of simplicity, the various features and functions illustrated in the block diagram of FIG. 4 are connected together using a common bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 for communicating with other network nodes, e.g., other vehicles (e.g., the one or more other V-UEs 160), relays (e.g., 195, 295), infrastructure access points (e.g., the one or more roadside access points 164), P-UEs (e.g., the one or more P-UEs 104), base stations (e.g., base stations 102), etc., via at least one designated RAT (e.g., C-V2X or IEEE 802.11p) over a medium of interest utilized by the unicast sidelinks 162. The transceiver 404 may be variously configured for transmitting and encoding signals (e.g., messages, indications, information, and so on), and, conversely, for receiving and decoding signals (e.g., messages, indications, information, pilots, and so on) in accordance with the designated RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 for receiving satellite signals. The SPS receiver 406 may comprise any suitable hardware and/or software for receiving and processing SPS signals. The SPS receiver 406 requests information and operations as appropriate from the other systems, and performs the calculations necessary to determine the UE's 400 position using measurements obtained by any suitable SPS algorithm.

One or more sensors 408 may be coupled to a processor 410 to provide information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The processor 410 may include one or more microprocessors, microcontrollers, ASICs, and/or digital signal processors that provide processing functions, as well as other calculation and control functionality. The processor 410 may include any form of logic suitable for performing, or causing the components of the UE 400 to perform, at least the techniques provided herein. In some aspects, the processor 410 may include a modem processor to manage at least in part to perform functions at the PHY layer and MAC layer and an application processor configured at least in part to perform functions at the application layer.

The processor 410 may also be coupled to a memory 414 for storing data and software instructions for executing programmed functionality within the UE 400. The memory 414 may be on-board the processor 410 (e.g., within the same integrated circuit (IC) package), and/or the memory 414 may be external to the processor 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 provides for voice communication services with the UE 400. The keypad 454 comprises any suitable buttons for user input to the UE 400. The display 456 comprises any suitable display, such as, for example, a backlit liquid crystal display (LCD), and may further include a touch screen display for additional user input modes.

In an aspect, the UE 400 may include a relay acquisition assistance module 170 functionally coupled to or integrated into the processor 410. The relay acquisition assistance module 170 may be a hardware, software, or firmware component that, when executed, causes the UE 400 to perform the operations described herein. For example, the relay acquisition assistance module 170 may be a software module stored in memory 414 and executable by the processor 410 or may be a combination of hardware and software. As another example, the relay acquisition assistance module 170 may be a hardware circuit (e.g., an ASIC, a field programmable gate array (FPGA), etc.) within the UE 400. The functions of the of the relay acquisition assistance module 170 will be discussed in greater detail below.

V2X communications in 5G can occur in both FR1 (sub-6 GHz, e.g., 450 MHz-6 GHz) and FR2 (mmW band, e.g., 24250 MHz-52600 MHz). For mmW unicast D2D or V2V communications, the initial communication establishment between neighboring devices (e.g., used herein as vehicles V-UEs 302 and 304 solely for illustration and not limitation) can be accomplished respectively in two different approaches in two deployment options, a standalone (SA) deployment and a non-standalone (NSA) deployment. In SA deployment, only the mmW frequency band can be used. A mmW radio sidelink can be established between two vehicles without the support of any other previously established communication link that may be, for example, in a different frequency band or in a different RAT.

Alternatively, establishment of the unicast mmW sidelink, including radio bearer establishment and associated QoS negotiation, can occur in the NSA deployment option. In the NSA deployment option, UEs can support communication in both FR1 and FR2. Thus, it is possible that the D2D or V2V mmW sidelink in FR2 (which uses a specific type of radio bearer configured for communication in mmW) is established with the support of a previously established direct link/connection (e.g., sidelink 330) between the two V-UEs in FR1 with PC5-RRC signaling and/or device-to-device discovery mechanisms. In this approach, for example, one or more signaling radio bearers (SRBs) may be established over the FR 1 sidelink first, and then, one or more data radio bearers (DRBs) may be established over the FR2 sidelink.

Radio bearers are logical communication channels offered by Layer 2 to higher layers for the transfer of either user data (on DRBs) for a communication session or control data (on SRBs) for the communication session. An SRB carries dedicated control channel (DCCH) signaling data for a communication session. (A DCCH is a point-to-point dedicated channel for transmitting control information between a UE and the network or another UE.) An SRB is used during connection establishment to deliver control signaling while on the connection. During connection establishment, an RRC Connection Setup procedure establishes the SRB. The SRB is then used to send all subsequent control signaling (e.g., physical layer, MAC layer, and other access layer control information) to start the desired communication session and establish the DRBs for the communication. A DRB carries dedicated traffic channel (DTCH) data for a communication session. (A DTCH is a point-to-point dedicated channel for transmitting user/application data/traffic between a UE and the network or another UE.) Establishment of the DRBs is achieved using an RB Setup procedure on the SRB. The RB Setup procedure configures how both the DCCH and DTCH will be carried on the respective radio bearers.

Using the SRB, the configuration of the different access protocol layers are of a semi-static nature. Physical layer control is of a more dynamic nature in order to control resource allocation, in terms of time, frequency, space, and/or power. The access protocol layer configurations over the SRB occur at the time the radio bearer is being set up. The physical layer control and adaptation generally occur at the time the data is being exchanged.

Figure 5:
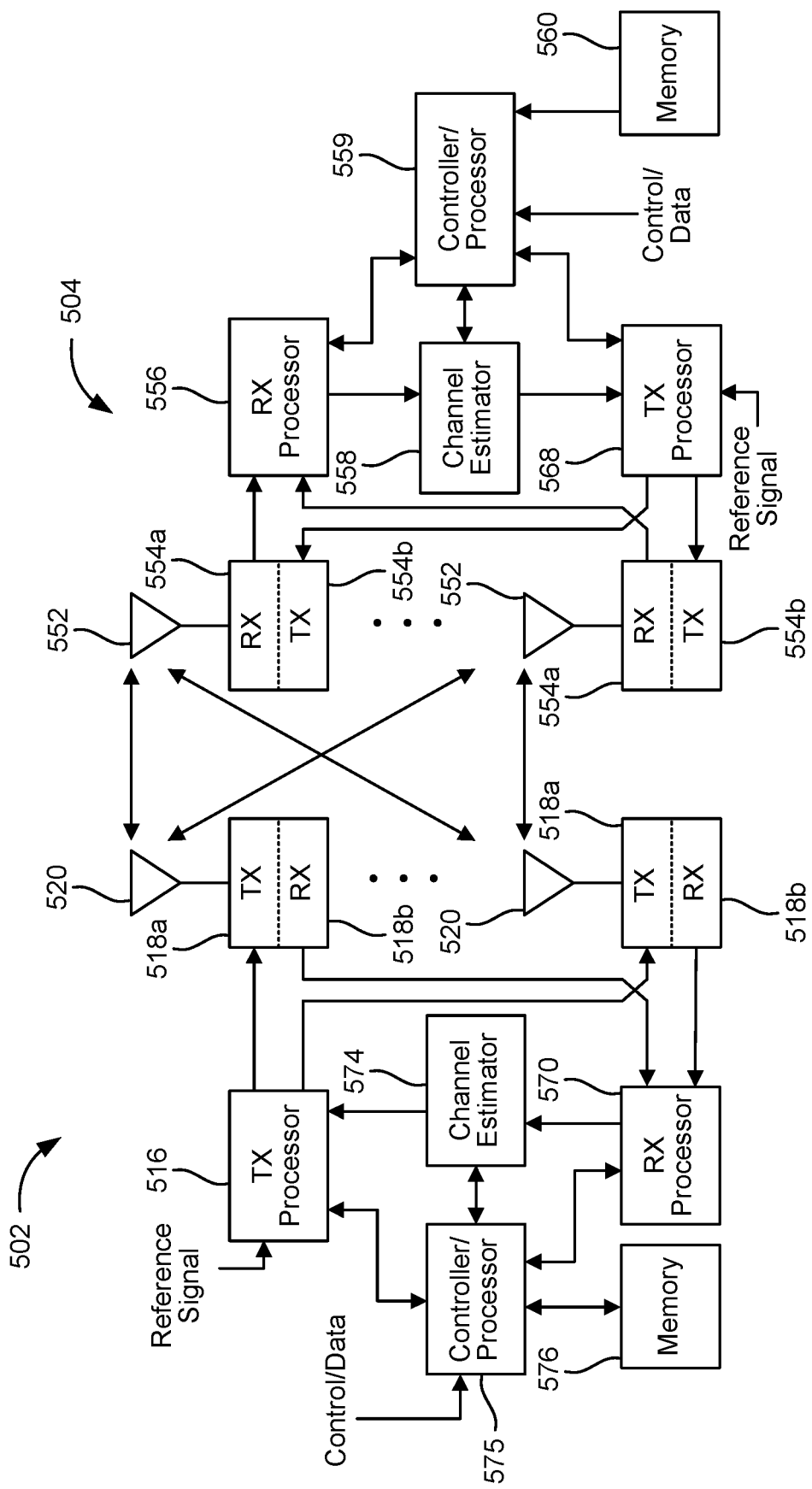
FIG. 5 is a block diagram illustrating various components of an exemplary UE and base station according to at least one aspect of the disclosure.

FIG. 5 illustrates an exemplary base station 502 (e.g., an eNB, a gNB, a small cell AP, a WLAN AP, etc.) in communication with an exemplary UE 504 or relay 504 in a wireless network, according to aspects of the disclosure. As discussed herein, a relay may include various components and functionalities related to a UE from the perspective of donor base stations serving the relay. Accordingly, the device referenced as 504 may be either a UE 504 or relay 504, but will generally be referred to as UE 504 for purposes of explanation. The base station 502 may correspond to any of base stations 102, 150, and 180 in FIG. 1 or gNB 222 or eNB 224 in FIGS. 2A and 2B, and the UE 504 may correspond to any of UEs 104, 152, 182, 160, 190 in FIG. 1, UE 240 in FIGS. 2A and 2B, UEs 302 and 304 in FIG. 3 or UE 400 in FIG. 4. In the DL, IP packets from the core network (NGC 210/EPC 260) may be provided to a controller/processor 575. The controller/processor 575 implements functionality for a radio resource control (RRC) layer, a packet data convergence protocol (PDCP) layer, a radio link control (RLC) layer, and a medium access control (MAC) layer. The controller/processor 575 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 516 and the receive (RX) processor 570 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 516 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 504. Each spatial stream may then be provided to one or more different antennas 520 via a separate transmitter 518a. Each transmitter 518a may modulate an RF carrier with a respective spatial stream for transmission.

At the UE 504, each receiver 554a receives a signal through its respective antenna 552. Each receiver 554a recovers information modulated onto an RF carrier and provides the information to the RX processor 556. The TX processor 568 and the RX processor 556 implement Layer-1 functionality associated with various signal processing functions. The RX processor 556 may perform spatial processing on the information to recover any spatial streams destined for the UE 504. If multiple spatial streams are destined for the UE 504, they may be combined by the RX processor 556 into a single OFDM symbol stream. The RX processor 556 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 502. These soft decisions may be based on channel estimates computed by the channel estimator 558. The soft decisions are then decoded and de-interleaved to recover the data and control signals that were originally transmitted by the base station 502 on the physical channel. The data and control signals are then provided to the controller/processor 559, which implements Layer-3 and Layer-2 functionality.

The controller/processor 559 can be associated with a memory 560 that stores program codes and data. The memory 560 may be referred to as a computer-readable medium. In the UL, the controller/processor 559 provides demultiplexing between transport and logical channels, packet reassembly, deciphering, header decompression, and control signal processing to recover IP packets from the core network. The controller/processor 559 is also responsible for error detection.

Similar to the functionality described in connection with the DL transmission by the base station 502, the controller/processor 559 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator 558 from a reference signal or feedback transmitted by the base station 502 may be used by the TX processor 568 to select the appropriate coding and modulation schemes, and to facilitate spatial processing. The spatial streams generated by the TX processor 568 may be provided to different antenna 552 via separate transmitters 554b. Each transmitter 554b may modulate an RF carrier with a respective spatial stream for transmission. In an aspect, the transmitters 554b and the receivers 554a may be one or more transceivers, one or more discrete transmitters, one or more discrete receivers, or any combination thereof.

The UL transmission is processed at the base station 502 in a manner similar to that described in connection with the receiver function at the UE 504. Each receiver 518b receives a signal through its respective antenna 520. Each receiver 518b recovers information modulated onto an RF carrier and provides the information to a RX processor 570. In an aspect, the transmitters 518a and the receivers 518b may be one or more transceivers, one or more discrete transmitters, one or more discrete receivers, or any combination thereof.

The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover IP packets from the UE 504. IP packets from the controller/processor 575 may be provided to the core network. The controller/processor 575 is also responsible for error detection.

The various aspects disclosed include techniques fleet systems or other network configurations which use relays to provide network connectivity to various UEs. It will be appreciated that the relay may be viewed as a mobile access point from the UE, but as a UE from the perspective of its serving base station (e.g., eNB, gNB, etc.). Additionally, the relay and UE may connect via a D2D interface such as, sidelink, PC5, V2X, etc. discussed herein.

Figure 6A:
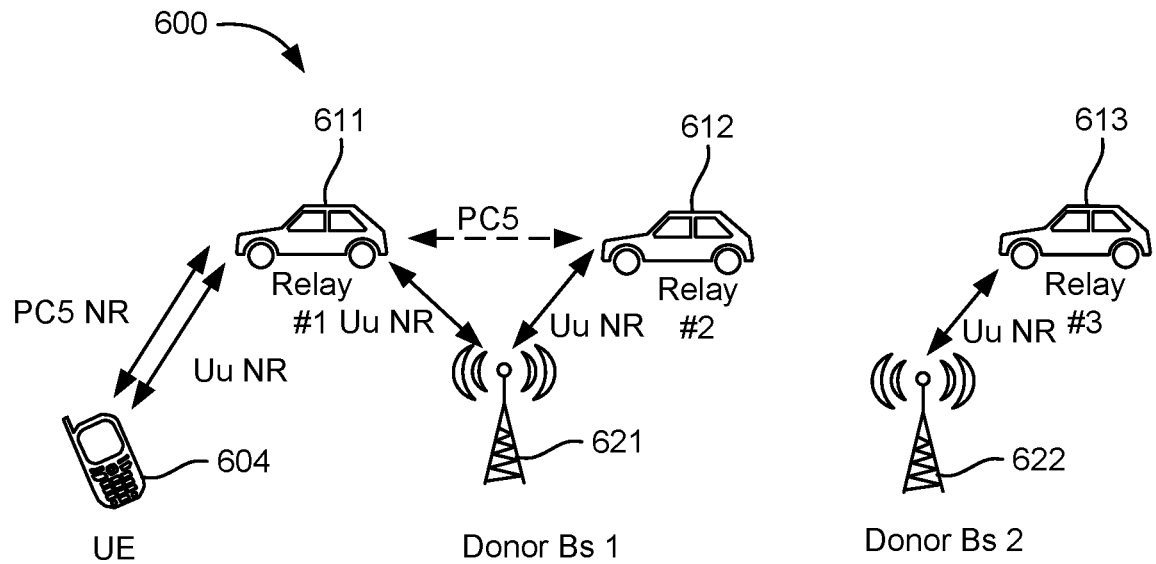
FIG. 6A illustrates an example relay networking system according to aspects of the disclosure.

For example, FIG. 6A illustrates an example relay networking system 600 (e.g., fleet network or other network using relays) according to aspects of the disclosure. The relays 611, 612 and 613 may be placed in vehicles or other mobile platforms. The relays 611, 612 and 613 provide coverage to neighboring UEs (which can be in the vehicle itself, or in the vicinity of the vehicle), e.g., UE 604. The relays can obtain coverage from stationary base stations (e.g., gNBs, eNBs, etc.) in the macro network (e.g., wireless communication system 100), these base stations may also be referred herein to as a "donor Bs", such as donor Bs 621 and donor Bs 622. The radio link between a donor Bs (e.g, donor Bs 621 or donor Bs 622) and a relay (e.g., relay 611, relay 612 or relay 613) uses Uu NR (e.g., as specified in 3GPP Release 15). For example, relay 611 has a radio link to donor Bs 621 and relay 612 also has a radio link to donor Bs 621. Likewise, relay 613 has a radio link to donor Bs 622. Accordingly, it will be appreciated that more than one relay be in communication with a given donor Bs. Also, it will be appreciated that more than one UE can be connected to a relay via one or more radio links, although only UE 604 and relay 611 are illustrated. The link between a UE and a relay can use Uu NR or PC5 NR as specified in 3GPP Release 15, or a combination of both. For example, UE 604 can communicate to relay 611 using either Uu NR, PC5 or a combination of both. Additionally, in some aspects, there may be a PC5 NR link between relays (e.g., the PC5 link between relay 611 and relay 612). In some aspects, the relay networking system re-uses the Integrated Access and Backhaul (IAB) architecture selected by 3GPP in Rel-16 to enable a wireless backhaul through multi-hop L2 relay networks (see, e.g., Architecture 1a in TR 38.874).

Figure 6B:
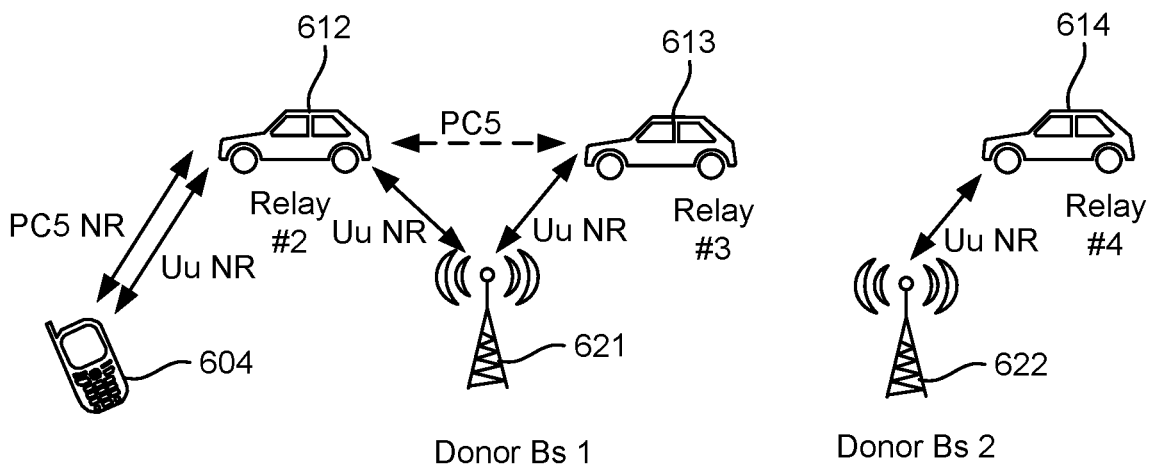
FIG. 6B illustrates an example relay networking system at another point in time according to aspects of the disclosure.

FIG. 6B illustrates the example relay networking system 600 at a different time according to aspects of the disclosure. As noted above, the relays 612, 613 and 614 may be placed in vehicles or other mobile platforms. Accordingly, in the relay networking system 600, relays providing service to the UEs may be moving. This presents challenges as the relays available to the UE (e.g., UE 604) may change over time. Additionally, the mobility or the relays can cause the relay to have to handover from one donor Bs to another. For example, relay 613 changed to donor Bs 621 from donor Bs 622 in the time interval illustrated between FIG. 6A and FIG. 6B. Also, UE 604 is linked to relay 612 in FIG. 6B instead of relay 611 as illustrated in FIG. 6A. Thus, it will be appreciated that the list of neighboring relays that the UE is expected to see while camped on a particular relay can be changing over time. If the UE in idle mode always selects the best cell based on the UEs scanning, as in traditional network solutions, the UE will have to perform very frequent reselections. Consequently, a neighbor list in idle mode is useful in the fleet network systems or other systems that use relays for connectivity to UE to reduce the number of reselections. In connected mode, according to various aspects disclosed, the neighbor lists can be dynamically updated and sent to the UE, based on the UE's location and/or the relays locations, since the relays providing service to the UEs are moving, and thus the list of neighboring relays that the UE is expected to see while camped on a particular relay keeps changing.

Figure 6C:
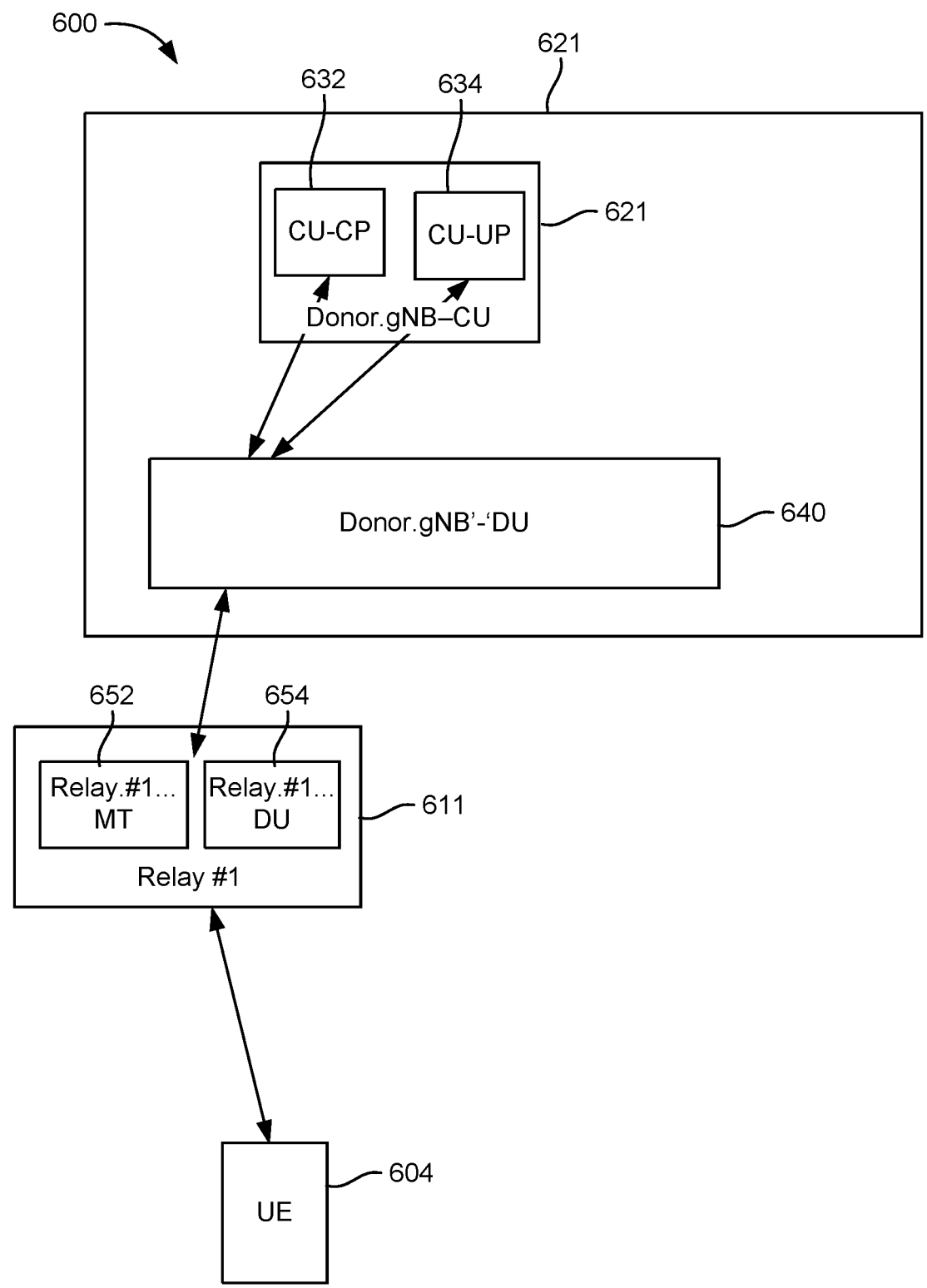
FIG. 6C illustrates another example relay networking system according to aspects of the disclosure.

FIG. 6C illustrates the example relay networking system 600 in functional blocks according to aspects of the disclosure. As noted above, in some aspects, the relay networking system 600 re-uses the Integrated Access and Backhaul (IAB) architecture selected by 3GPP in Rel-16 to enable a wireless backhaul through multi-hop L2 relay networks. It will be appreciated that in some aspects, the equivalent of a donor Bs 621 (e.g., donor gNB) in the relay networking system 600 has the functionality of a centralized unit (CU) 630 and distributed unit (DU) 640. It will be appreciated that other functional aspects of the donor Bs 621 are not illustrated here, but are discussed in the foregoing in relation to the various base stations (e.g., gNB, eNB, etc.) illustrated and discussed. The CU 630 can be further disaggregated into the CU user plane (CU-UP) 632 and CU control plane (CU-CP) 634, both of which connect to the DU over F1-U and F1-C interfaces, respectively. Relay 611 can include mobile-termination (MT) 652 function and DU 654. It will be appreciated that other functional aspects and components of the relay 611 are not detailed here, but are discussed in the foregoing (e.g, 504 and general UE communication functionalities). MT 652 function terminates the radio interface layers of the backhaul Uu interface toward the donor Bs 621 or other relays (not illustrated). Accordingly, the MT 652 of the relay connects to an upstream relay (not illustrated) or the donor Bs 621. The DU 654 function of the relay establishes RLC-channels to UEs (e.g., UE 604) and to MTs of downstream relays (not illustrated). It will be appreciated that in some aspects, the relay 611 and/or donor Bs 621 may contain multiple DUs. Although not expressly illustrated, it will be appreciated that the donor Bs 621 DU 640 may support connections to UEs (e.g., UE 604) and additional MTs of downstream relays. In some aspects, the donor Bs 621 holds a CU 630 for the DUs of all relays and for its own DU 640. According to various aspects disclosed, the DUs (e.g., DU 654) on a relay 611 are served by only one donor Bs 621. This donor Bs 621 may change as illustrated in FIGS. 6A and 6B.

Figure 7:
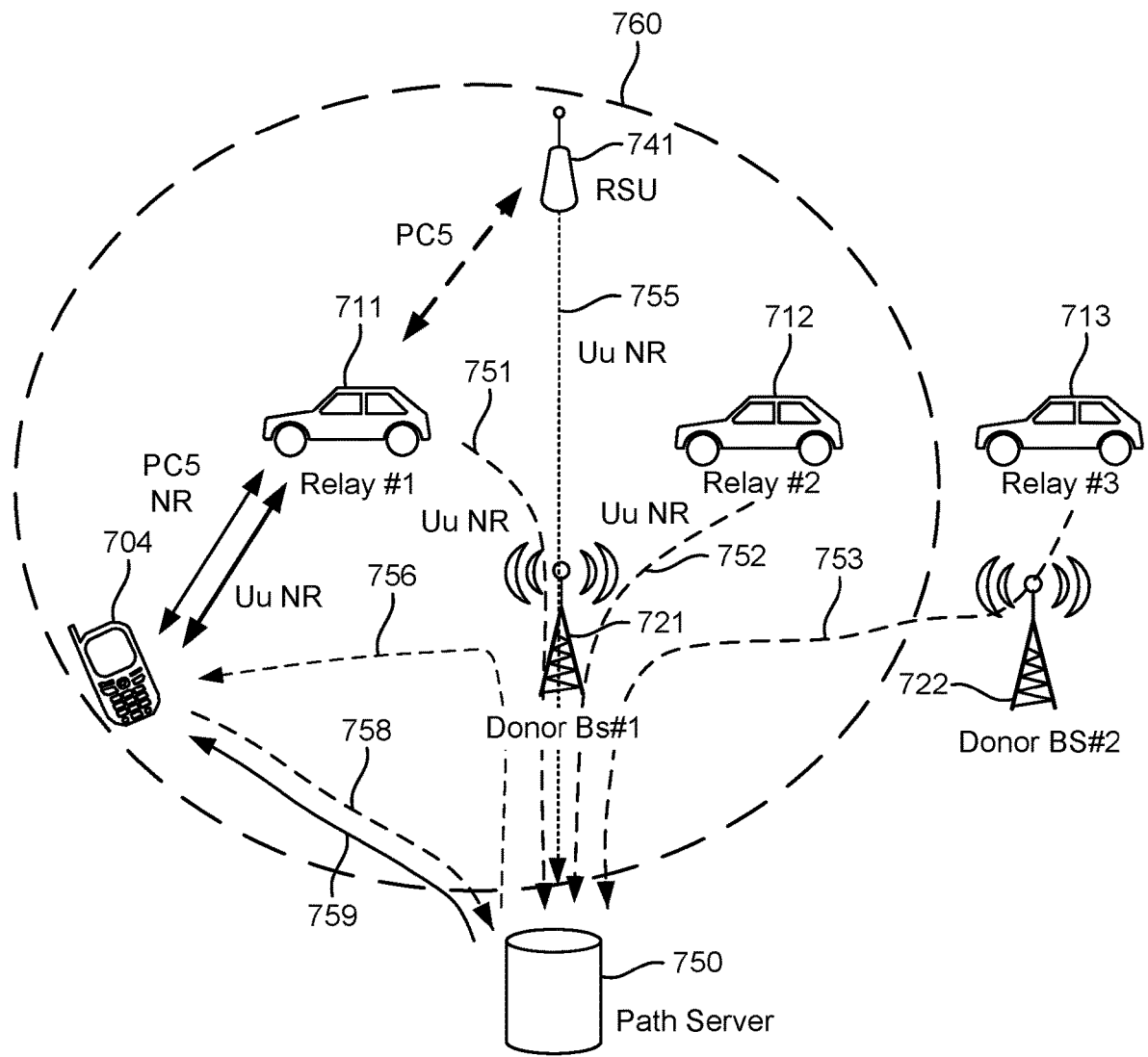
FIG. 7 illustrates another example relay networking system according to aspects of the disclosure.

FIG. 7 illustrates an example relay networking system which may be part of a larger wireless communications network 700 (or more generally referred herein as network 700) in accordance with aspects of the disclosure. As discussed in the foregoing, in a network architecture having mobile relays (e.g. relays 711 712 and 713) serving various UEs (e.g, UE 704), initial connection and handover to relays can be challenging since the UE typically will not know what relays will be available in a given area at a given time.

For example, when the UE 704 is first powered up, it needs to connect to the network 700 (either via a relay 711 or directly to a donor Bs 721 (e.g., donor gNB, donor eNB, etc.) before it can receive dynamically updated information on neighboring relays from the network. The UE 704 can detect the donor Bs 721 by using existing cell selection procedures. The detection of the relays (e.g., relays 711, 712 and 713) can be enabled by preconfiguring the UE 704 with static information about the relays (e.g., relays 711, 712 and 713) that the UE 704 can expect to find in its location. The relay cell list may be preconfigured on the UE 704 using a universal integrated circuit card (UICC), information stored in a Mobile Equipment (ME), or any other mechanism to preconfigure the UE. The information can be based on information about relays (e.g., relays 711, 712 and 713) placed in vehicles which have a known path (e.g. buses, tramways, fleet of autonomous vehicles, etc.). Alternatively, the UE can connect to a path server 750 using other connectivity means (e.g. WiFi, WWAN, etc.) where the path server 750 can maintain a database of the relays (e.g., relays 711, 712 and 713) and their location and optionally the time, or time windows when they will be at the location. Using this information, the path server 750 can determine which relays (e.g., relays 711 and 712) are in an area of interest 760 and potentially available for the UE 704 to access. In further aspects disclosed, the UE 704 can, after having connected to the donor Bs 721 or relay 711, query the path server 750 at a later time to get updated information about the relays (e.g., relays 711, 712 and 713).

Additional details regarding the various aspects disclosed are provided in the following, however, it will be appreciated that the various aspects disclosed and associated functionalities may be performed independently or in various combinations. For example, the ability of the UE 704 to query the path server 750 may be included in the functionality of a given UE or may optionally not be configured. Accordingly, the various aspects disclosed herein for various devices should not be construed to be required on each device (e.g, UE 704, relays 711, 712, 713, etc.).

Referring back to FIG. 7, relays 711, 712 and 713 may provide their path information to the path server 750. The path information 751 for relay 711 and path information 752 for relay 712 can be provided via the donor Bs 721 and path information 753 for relay 713 can be provided via donor Bs 722. In other aspects, the path information 755 may be provided via a roadside unit (RSU) 741 to path server 750. For example, the path information 755 can be provided via a PC5 link between relay 711 and RSU 741 and a Uu link between RSU 741 and donor Bs 721 to path server 750, however, the various aspects disclosed are not limited to any specific radio access technology for providing the path information to path server 750. Alternatively, the RSU 741 could use a fixed line backhaul connection to the Internet that provides access to the path server 750. After receiving the path information, the path server 750 can compile a relay cell list based on location area and time (e.g., time of day) or time window. In some aspects, the path server 750 may subscribe to an area of interest 760 in a wireless communications network (e.g., network 700), based on the location area and time information. In some aspects, when there are UEs (e.g. UE 704) registered to the network 700 in that region, or when a mobility event is triggered when for example, UE 704 enters related area of interest 760, path server 750 can communicate the relay cell list (e.g., associated with a GeoArea and Time Window) to the UE 704. In various aspects disclosed, the relay cell list may communicated 756 to the UE 704 via multiple mechanisms, such as, via control plane provisioning mechanism (e.g., via a policy control function (PCF), or further through a Network Exposure Function (NEF)). Alternatively or in addition to, the path server 750 may use an area/region based broadcast mechanism (e.g. via multimedia broadcast multicast services (MBMS), evolved multimedia broadcast multicast services (eMBMS) or 5G multicast broadcast services (MBS)) to send the relay cell list to a related area. In other additional aspects, UE 704 may try to query 758 the path server 750, when it has a connection to Internet (e.g. via macro cell, WiFi, etc.). This query 758 can include the location and time of the access for the UE 704. Upon receiving the query 758, the path server 750 can provide the relay cell list 759 to the UE 704.

Figure 8:
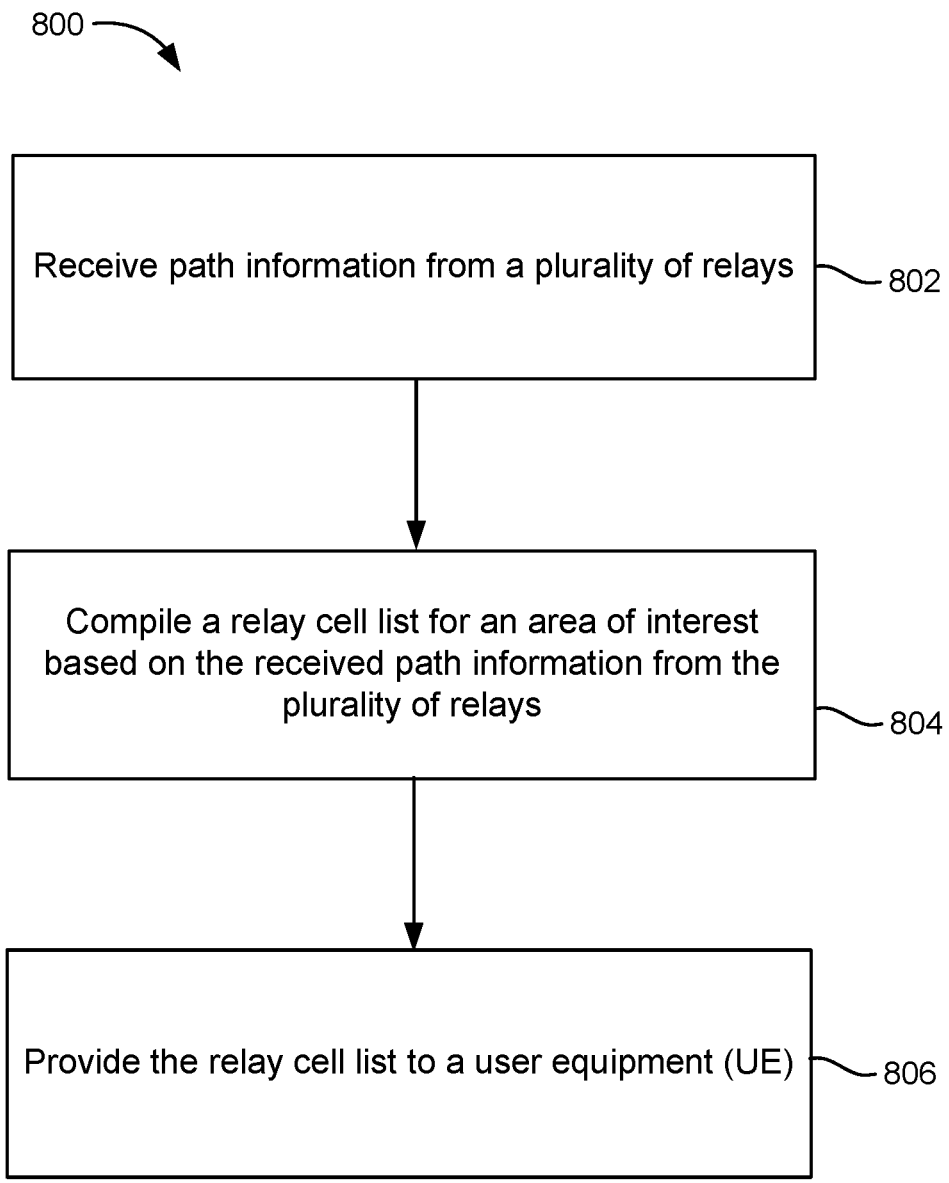
FIG. 8 illustrates an example partial flowchart of one or more methods according to aspects of the disclosure.

FIG. 8 illustrates a flowchart of method 800 from the perspective of the path server according to various aspects disclosed herein. The path server can be one or more servers in or in communication with a wireless communications network (e.g., 100, 700, etc.) including one or more computer programs, which can be configured to perform particular operations or actions. For example, the Path Server can be the PCF, NEF, part of a V2X Application Server, or network data analytics function (NWDAF). According to various aspects disclosed, the method 800 may include at 802, receiving path information from a plurality of relays (e.g, relays 711, 712, 713). The path server, at 804, can then compile a relay cell list for an area of interest based on the received path information from the plurality of relays. At 806, the path server can provide the relay cell list to a user equipment (UE) (e.g, UE 704). In the following disclosure certain references will be used for the various devices (e.g., UE 704, relay 711, path server 750, etc.) for explanation, but the various aspects disclosed are not limited to the referenced device and/or any specific features associated therewith. For example, although UE 704 may be referenced any of the UEs disclosed and discussed herein may be associated with the various aspects described.

Additional aspects disclosed will also be appreciated from the foregoing disclosure. The area of interest can be identified as a portion of a wireless communications network (e.g., a macro cell, service area of one or more donor base stations, etc.). In compiling relay cell list for the area of interest, it will be appreciated that the location and associated time information from the relay path can be converted by the path server 750 to information understandable by the wireless communications network (e.g., cell ID, physical cell ID (PCI), an enhanced cell identifier (E-CID), Closed Subscriber Group ID (CSG ID), etc.), which is determined based on geo-location information and time window information for the plurality of relays (e.g, 711-712, etc.) contained in the path information. Accordingly, the portion of the wireless communications network should be determined from the path information to contain at least one donor base station that could be connected to at least one of the plurality of relays during the time window, when the at least one relay (e.g., 711) will be present. It will be appreciated that the various aspects are not limited to one relay being present and the relay cell list may have multiple relays that will be in the area of interest for various time windows and may include some relays that will be present at future times, to reduce updates provided to the UE 704. For example, in relation to FIGS. 6A and 6B, relay 611 was present at a first time illustrated in FIG. 6A, but was outside the area of interest in a subsequent time illustrated in FIG. 6B.

Once the area of interest is identified in the wireless communications network, the path server 750 can be notified when the UE 704 is registering to the wireless communications network in the area of interest and provide the relay cell list to the UE 704. As mentioned in the foregoing, the relay cell list can be provided to the UE 704 via a control plane provisioning function (e.g., a policy control function (PCF)) or other functions. The path server 750 can also provide the relay cell list to the UE 704, when the UE 704 enters the area of interest due to a mobility event. As discussed above, the relay list can be provided to the UE 704 using various mechanisms, such as, via a broadcast transmission (e.g., MBMS, eMBMS, 5G MBS) in the area of interest. Alternatively, the relay cell list can be provided in response to receiving a query from the UE 704 including a location and time of access to the area of interest. The location and time of access information can be used by the path server 750 to ensure the appropriate relays are included in the relay cell list, since as discussed herein the relays present in a given area of interest will change over time. The query can be received via an Internet connection. However, it will be appreciated that the communications path and mechanism of the query is not limited to any specific configuration.

The path information received from each of the relays can include a plurality of geographic locations and associated times, time window, time and duration, etc. for each of the plurality of relays. The path information is used to determine when a relay will be in a particular area of interest, so the format of the time information is not limiting, so long as it allows the for the path server 750 to determine the relay's presence in the area of interest. In some aspects, the relay cell list may also have a time window or range of times for which it is valid. Accordingly, in some aspects, the relay cell list may include at least one relay from the plurality of relays that is expected to be located in the area of interest during at least a portion of the time window in the future. For example, a relay may not currently be present in the area of interest, but may be present in the area of interest at a future time and this relay could be included in the relay cell list. In some aspects, the relay cell list may not have any effective time window (e.g., if the relay cell list is preconfigured or the identified relays are only a snap shot of relays in an area of interest at a current time). Accordingly, in some aspects, the relay cell list may not include specific time information for all or some relays in the relay cell list (e.g., a relay may always be present based on its route, the relay list is provided as a snap shot, so only relays that are present when the relay cell list is sent may be provided with no time information).

Figure 9:
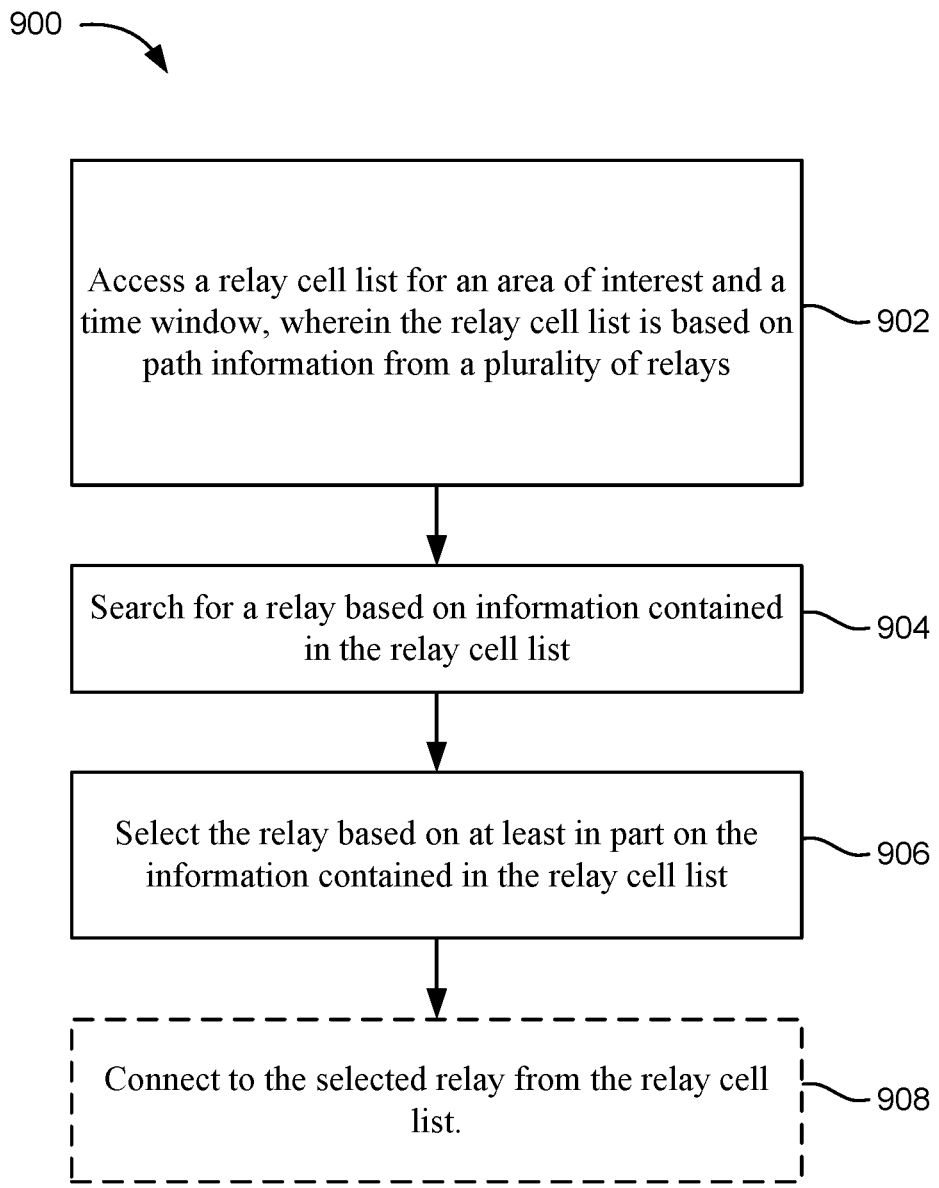
FIG. 9 illustrates an example partial flowchart of one or more methods according to aspects of the disclosure.

FIG. 9 illustrates a flowchart of method 900 from the perspective of a UE 704 according to various aspects disclosed herein. The method includes the UE 704, at 902, accessing a relay cell list for an area of interest, where the relay cell list is based on path information from a plurality of relays. It will be appreciated that the relay cell list may be preconfigured or provided by the path server 750, as discussed herein. At 904, the UE 704 can search for a relay based on information contained in the relay cell list. At 906, the UE 704 can select the relay 711 based at least in part on the information contained in the relay cell list. At 908, optionally, the UE 704 can connect to the selected relay 711 from the relay cell list. Whether preconfigured or supplied dynamically, the UE can use the relay cell list to assist searching for and selecting a relay among all the discovered cells.

Various aspects may further include, the UE 704 querying the path server 750 to request the relay cell list. The querying may be performed using an Internet connection, as discussed above. In some aspects, the UE 704 can discover the path server 750 using a fully qualified domain name (FQDN) for the path server 750. In some aspects, the UE 704 can further request an updated relay cell list. The updated relay cell list can be requested based on at least one of the UE 704 performing a handover to new base station, an elapsed time since receiving the relay cell list, or the UE 704 being unable to connect to any of the relays listed in the relay cell list. In some aspects according to the various aspects disclosed herein, the UE 704 can further use the relay cell list to avoid connecting to at least one relay in the relay cell list. For example, the UE 704 may determine, from information in the relay cell list, the at least one relay has a limited duration in the area of interest. Accordingly, even though other cell selection factors may be good (e.g., signal strength/quality), based on information indicating the relay will only be in the area of interest for a short duration (e.g., on the order of seconds), the UE 704 may select another relay.

Figure 10:
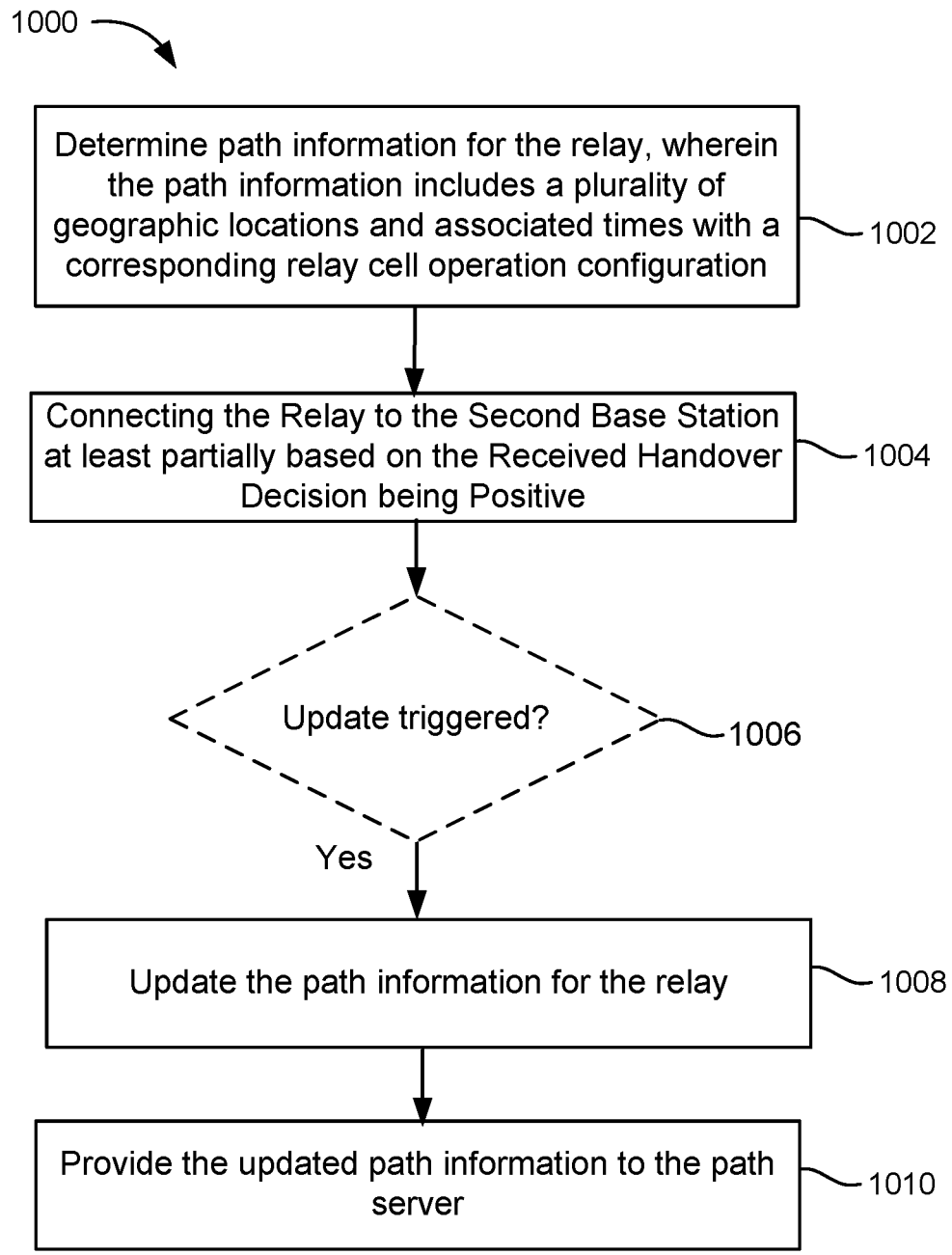
FIG. 10 illustrates an example partial flowchart of one or more methods according to aspects of the disclosure.

FIG. 10 illustrates a flowchart of method 1000 from the perspective of a relay (e.g., relays 711, 712, etc.) according to various aspects disclosed herein. The method includes the relay 711, at 1002, determining path information for the relay 711, where the path information includes a plurality of geographic locations and associated times with a corresponding relay cell operation configuration. It will be appreciated that the relay cell operation configuration can include at least one of, the Cell ID (including, PCI, ECGI, etc.) the relay 711 would use in the corresponding geographic locations; the frequency band the relay is serving in the corresponding geographic locations; the RAT type (E-UTRA, NR, sidelink, V2X, etc.) the relay is serving in the corresponding geographic locations; or operation limitations, such as, support of the Xn/X2 for mobility, etc. It will be appreciated that the relay cell operation configuration can include more than one of the foregoing examples of operation configuration information. Further, it will be appreciated that in one or more aspects of the disclosure, additional relay cell operation configuration information may be provided that can assist the path server 750 and/or the UE 704. At 1004, the relay 711 provides path information for the relay 711 to a path server 750. Additional optional aspects may include determining if an update is triggered, at 1006. If the update is triggered, the relay 711 can update the path information for the relay 711, at 1008 and, at 1010, provide the updated path information for the relay 711 to the path server 750. According to various aspects, the updating may be triggered based on the relay 711 determining a deviation beyond a threshold from the path information provided to the path server 750. The deviation may include at least one of a deviation of geographic location or associated time from the path information provided. For example, a relay 711 may be substantially delayed form the timing of its scheduled route and/or may have to take a detour. Optionally, the updating may be triggered by a status of the relay 711. Optionally, the updating may be triggered by an elapsed time since providing the path information or a request from the path server 750. The relay 711 may determine its path information is based on a navigation system or based on a pre-determined route (e.g., bus route/schedule, tramcar, trolley, etc.). As discussed above, the relay 711 may provide the path information to the path server 750 via a direct Uu connection to a donor base station. Alternatively, the relay 711 may provide the path information to the path server 750 via a PC5 connection to a roadside unit (RSU) 741, as discussed in the foregoing. Accordingly, it will be appreciated that the various aspects disclosed herein are not limited to the illustrated and discussed example communication techniques to provide path information to the path server.

According to various aspects disclosed, the geographic locations may be provided as latitude and longitude coordinates. Alternatively, the geographic locations may be provided as civic location information, including streets and intersections. Accordingly, it will be appreciated that the format of the geographic locations provided by the relay 711 in the path information is not limited to the specific examples provided herein.

Likewise, the time(s) associated with the geographic location is not limited to a specific format. For example, the geographic locations may have associated times, time windows, times and durations, etc. for each of the plurality of relays. The path information is used determine when a relay will be in a particular area of interest, so the format of the geographic location and associated time information is not limiting, so long as it allows for the path server 750 to determine the relays presence in the area of interest. For example, the path information could include a series of geographic locations and associated times, or geographic locations and associated time windows, or geographic locations and an associate times and durations (e.g., a time of day and duration of x seconds).

The relay cell list compiled from the path information by the path server 750 may include the relay IDs, time windows related to the area of interest and various other information to assist the UE 704 in relay acquisition (e.g. search for, selection and/or connection). For example, in some aspects the for a give relay, the relay cell list may include a relay ID, time entering the area of interest, time exiting the area of interest, the relay's cell information (e.g. cell ID, physical cell ID (PCI), etc.). Alternatively, it may also include the close subscriber group ID (CSG ID) of the relay. As discussed above, the formatting is not limiting, for example, the time window a relay is in the area interest may be formatted as an entry and exit time, a start time and duration, etc.

It will be appreciated from the disclosure herein that other methods and variations of methods can be recognized and detailed flowcharts and/or discussion of each will not be provided. Accordingly, the various aspects of the disclosure should not be construed to be limited to the illustrative examples provided.

The functionality of the various devices, components, methods, etc. disclosed herein may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

Figure 11:
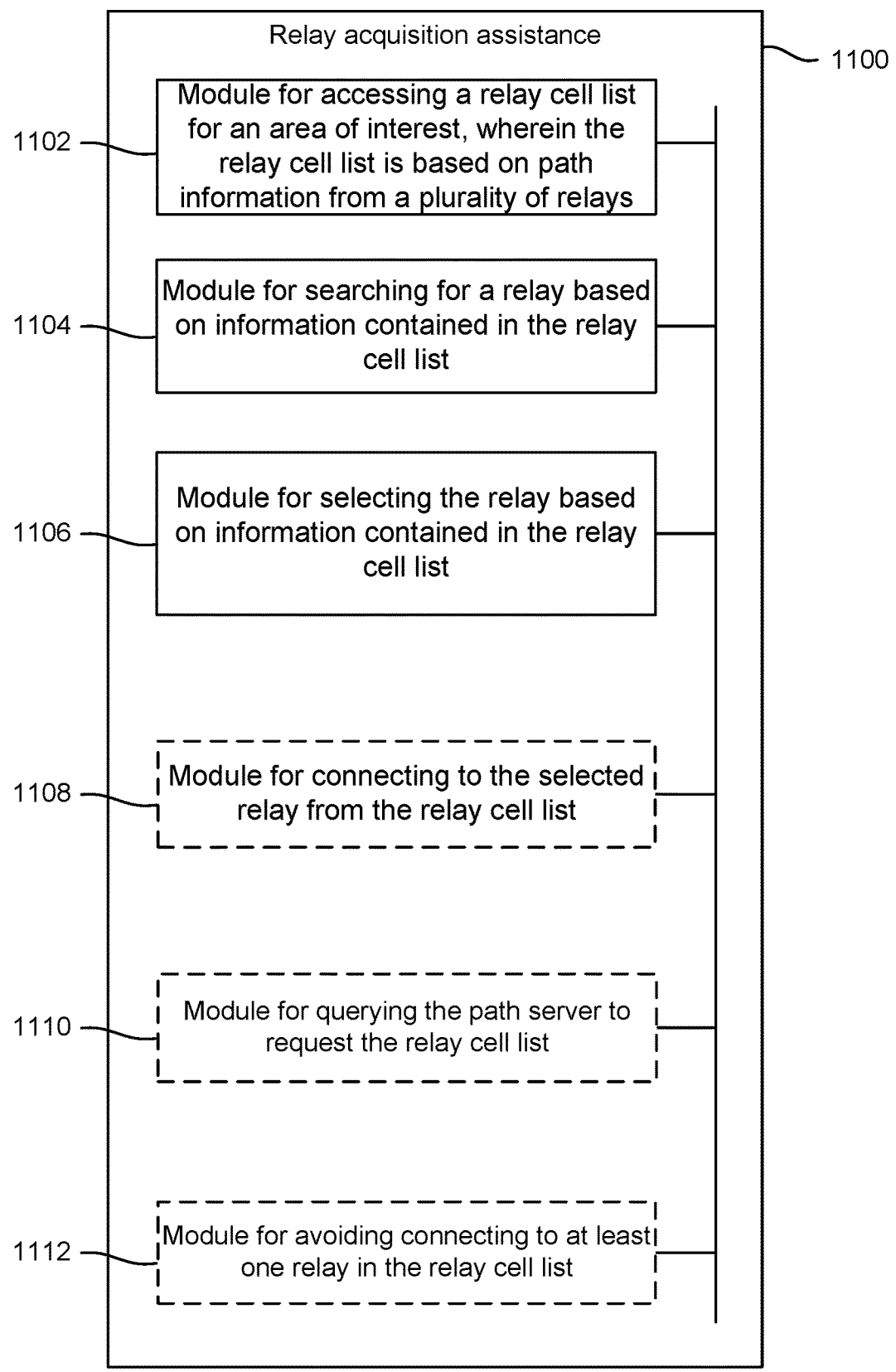
FIG. 11 illustrates an example UE device for implementing aspects of the disclosure represented as a series of interrelated functional modules.

FIG. 11 illustrates an example device 1100 (which may be similar to module 170) for implementing various aspects of the disclosure, which are represented as a series of interrelated functional modules. The device 1100 may correspond to any of the UEs depicted in the foregoing disclosure (e.g, in FIG. 7, UE 704, also in FIG. 1, such as UEs 104, 152, 160, 182, 190, any of UEs 240 depicted in FIGS. 2A and 2B, any of UEs 302, 304 in FIG. 3, etc.). In the illustrated example, a module 1102 for accessing a relay cell list for an area of interest, wherein the relay cell list is based on path information from a plurality of relays is provided. For example, the module 1102 may be implemented by a processing system (e.g., processor 410 and memory 414, in FIG. 4 or In FIG. 5, controller/processor 559 and a memory 560, etc.) as discussed herein. A module 1104 for searching for a relay based on information contained in the relay cell list, for example, may be implemented by a communication device (e.g., transceiver 404, processor 410 and memory 414, in FIG. 4 or in FIG. 5, RX 554a/TX 554, RX processor 556, TX processor 568, controller/processor 559 and/or memory 560). A module 1106 for selecting the relay based on information contained in the relay cell list, may correspond at least in some aspects to, for example, a processing system (e.g., processor 410 and memory 414, in FIG. 4 or in FIG. 5, controller/processor 559 and a memory 560, etc.). A module 1108 for connecting to the selected relay from the relay cell list, may correspond at least in some aspects to, for example, a communication device (e.g., transceiver 404 and/or a processing system e.g., processor 410, in FIG. 4 or in FIG. 5, RX 554a/TX 554, RX processor 556, TX processor 568, controller/processor 559 and/or memory 560). An optional module 1110 for querying the path server to request the relay cell list may correspond at least in some aspects to, for example, a communication device (e.g., transceiver 404 and/or processor 410 and memory 414, in FIG. 4, or in FIG. 5, RX 554a/TX 554, RX processor 556, TX processor 568, controller/processor 559 and/or memory 560). Another optional module 1112 for avoiding connecting to at least one relay in the relay cell list, may correspond at least in some aspects to, for example, a processing system (e.g., processor 410 and memory 414, in FIG. 4 or in FIG. 5, controller/processor 559 and/or memory 560). It will be appreciated that the foregoing modules and associated functionalities are not exhaustive of the various aspects disclosed herein and are provided solely as illustrative examples.

Figure 12:
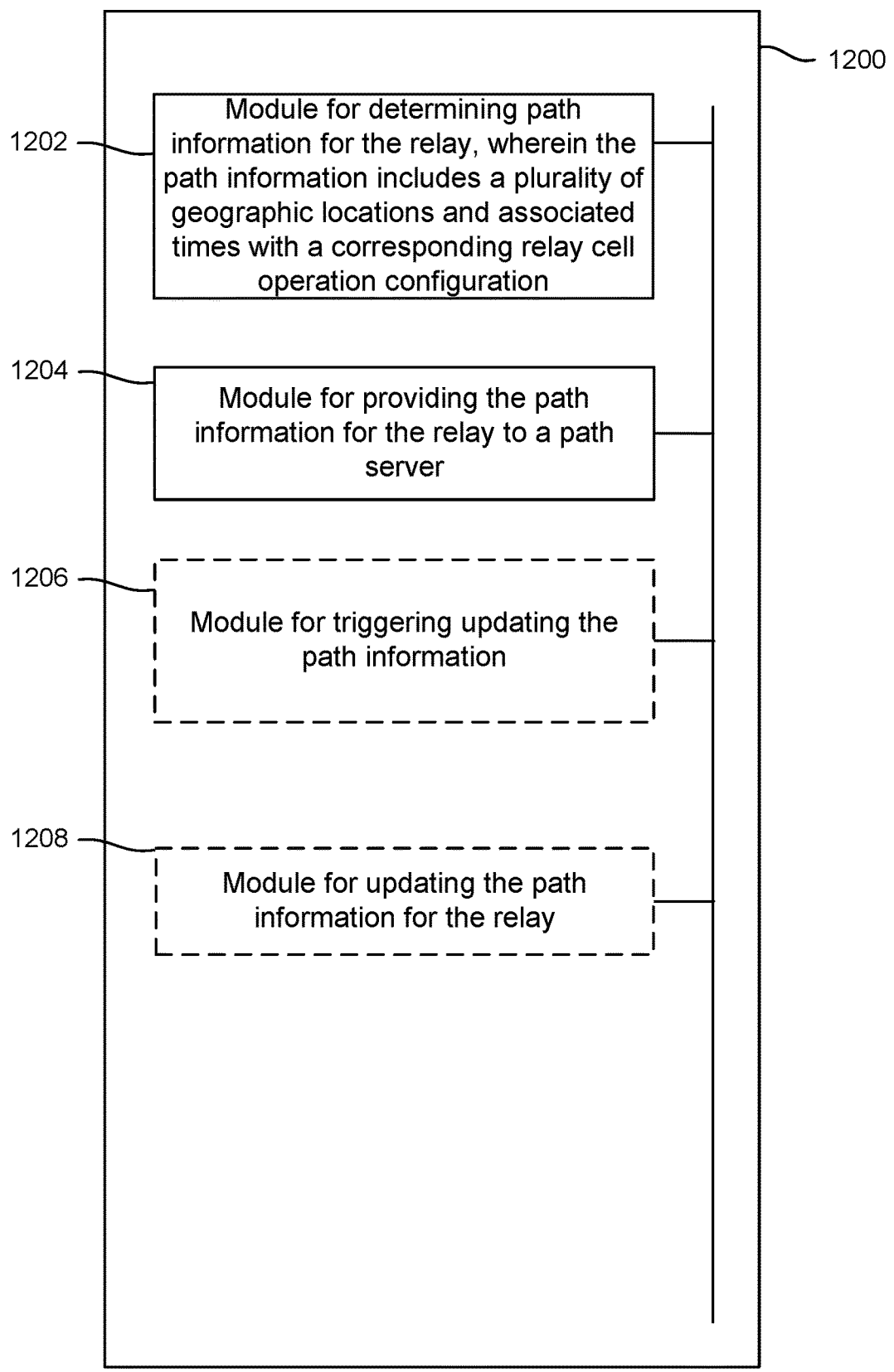
FIG. 12 illustrates an example relay device for implementing aspects of the disclosure represented as a series of interrelated functional modules.

FIG. 12 illustrates an example device 1200 which is used for implementing various aspects of the disclosure, and which is represented as a series of interrelated functional modules. The device 1200 may correspond to any of the relays depicted in the foregoing disclosure (e.g, in FIG. 7, relays 711, 712, 713, also in FIG. 1, such as relay 195, any of relays 295 depicted in FIGS. 2A and 2B, 504 in FIG. 5, 611-614 in FIGS. 6A-C, etc.). In the illustrated example, a module 1202 is provided for determining path information for the relay, wherein the path information includes a plurality of geographic locations and associated times with a corresponding relay cell operation configuration provided. For example, the module 1202 may be implemented by a processing system (e.g., controller/processor 559 and a memory 560, etc.) as discussed herein. A module 1204 for providing the path information for the relay to a path server, may correspond at least in some aspects to, for example, a communication device (e.g., in FIG. 5, RX 554a/TX 554, RX processor 556, TX processor 568, controller/processor 559 and/or memory 560). An optional module 1206 for triggering updating the path information may be provided. Also, another optional module 1208 for updating the path information for the relay may be provided. Modules 1206 and 1208 may correspond at least in some aspects to, for example, a processing system (e.g., in FIG. 5, controller/processor 559 and/or memory 560). The updated path information may be provided to path server using module 1204 or in some aspects an additional module may be provided for this functionality). It will be appreciated that the foregoing modules and associated functionalities are not exhaustive of the various aspects disclosed herein and are provided solely as illustrative examples.

Figure 13:
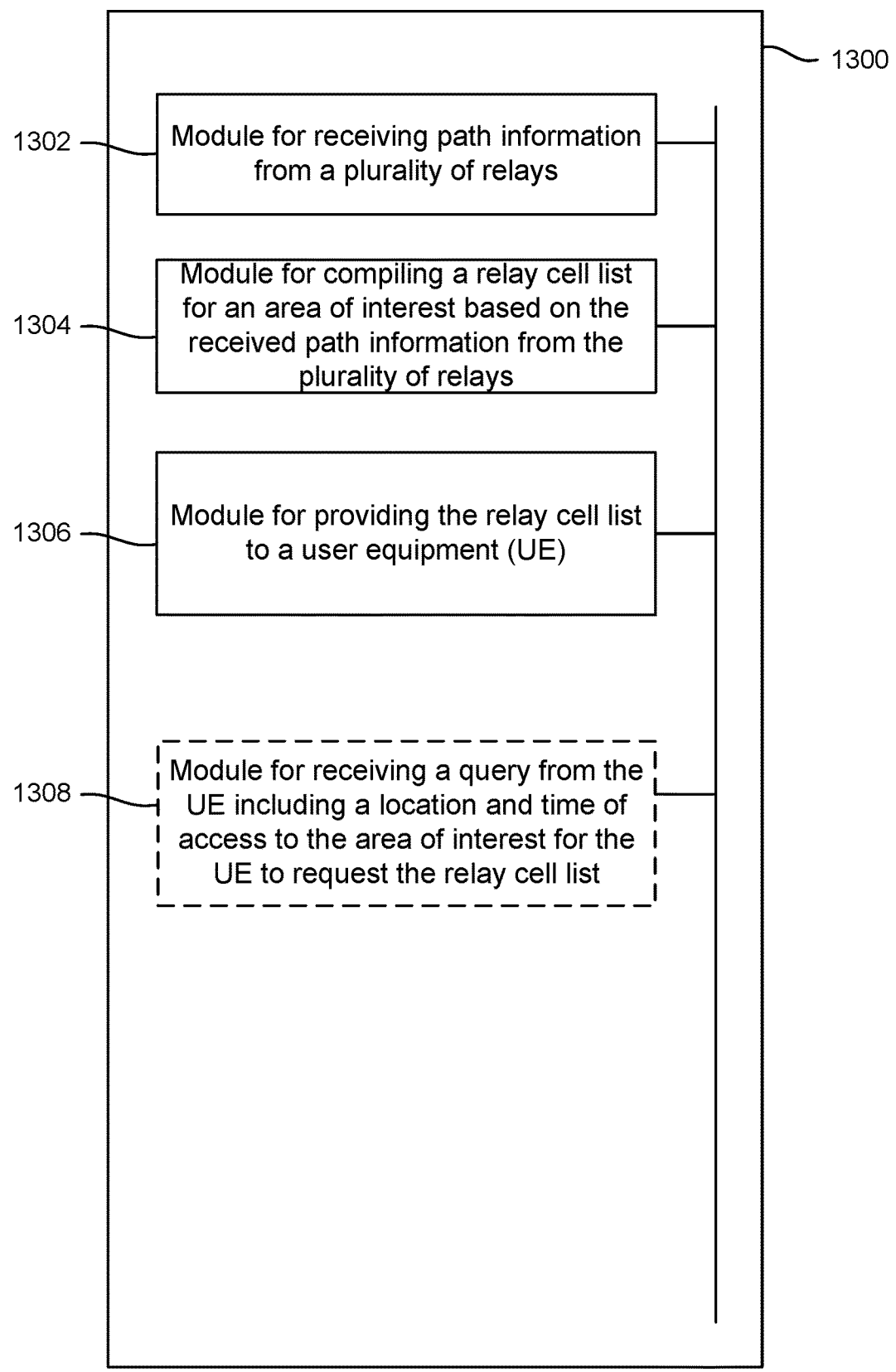
FIG. 13 illustrates an example path server device for implementing aspects of the disclosure represented as a series of interrelated functional modules.

FIG. 13 illustrates an example device 1300 for implementing various aspects of the disclosure, which are represented as a series of interrelated functional modules. The device 1300 may correspond to any of the path servers depicted in the foregoing or following disclosure (e.g, path servers 290 in FIGS. 2A and 2B, 750 in FIGS. 7 and 1400 in FIG. 14). In the illustrated example, a module 1302 for receiving path information from a plurality of relays is provided. For example, the module 1302 may be implemented by a communication device (e.g., communication device 1426, processing system 1436 and/or memory 1442, in FIG. 14), as discussed herein. A module 1304 for compiling a relay cell list for an area of interest based on the received path information from the plurality of relays may correspond at least in some aspects to, for example, a processing system (e.g., processing system 1436 and/or memory 1442, in FIG. 14). A module 1306 for providing the relay cell list to a user equipment (UE), may correspond at least in some aspects to, for example, a communication device (e.g., communication device 1426, processing system 1436 and/or memory 1442, in FIG. 14). An optional module 1308 for receiving a query from the UE including a location and time of access to the area of interest for the UE to request the relay cell list may correspond at least in some aspects to, for example, a communication device (e.g., communication device 1426, processing system 1436 and/or memory 1442, in FIG. 14). It will be appreciated that the foregoing modules and associated functionalities are not exhaustive of the various aspects disclosed herein and are provided solely as illustrative examples.

In addition, the modules, components and functions represented by FIGS. 11-13, as well as other modules, components and functions described herein, may be implemented using any suitable means. Such means also may be implemented, at least in part, using corresponding structure as taught herein. For example, the components described above in conjunction with the "module for" components also may correspond to similarly designated "means for" functionality. Thus, in some aspects one or more of such means may be implemented using one or more processors, memory, integrated circuits, or other suitable structure as taught herein, including as an algorithm. One skilled in the art will recognize in this disclosure an algorithm may be represented in the functions, actions, etc. described above, as well as in sequences of actions that may be represented by pseudo-code. For example, the components and functions represented by FIGS. 11-13 may include code for performing the functions, aspects and actions disclosed herein.

Figure 14:
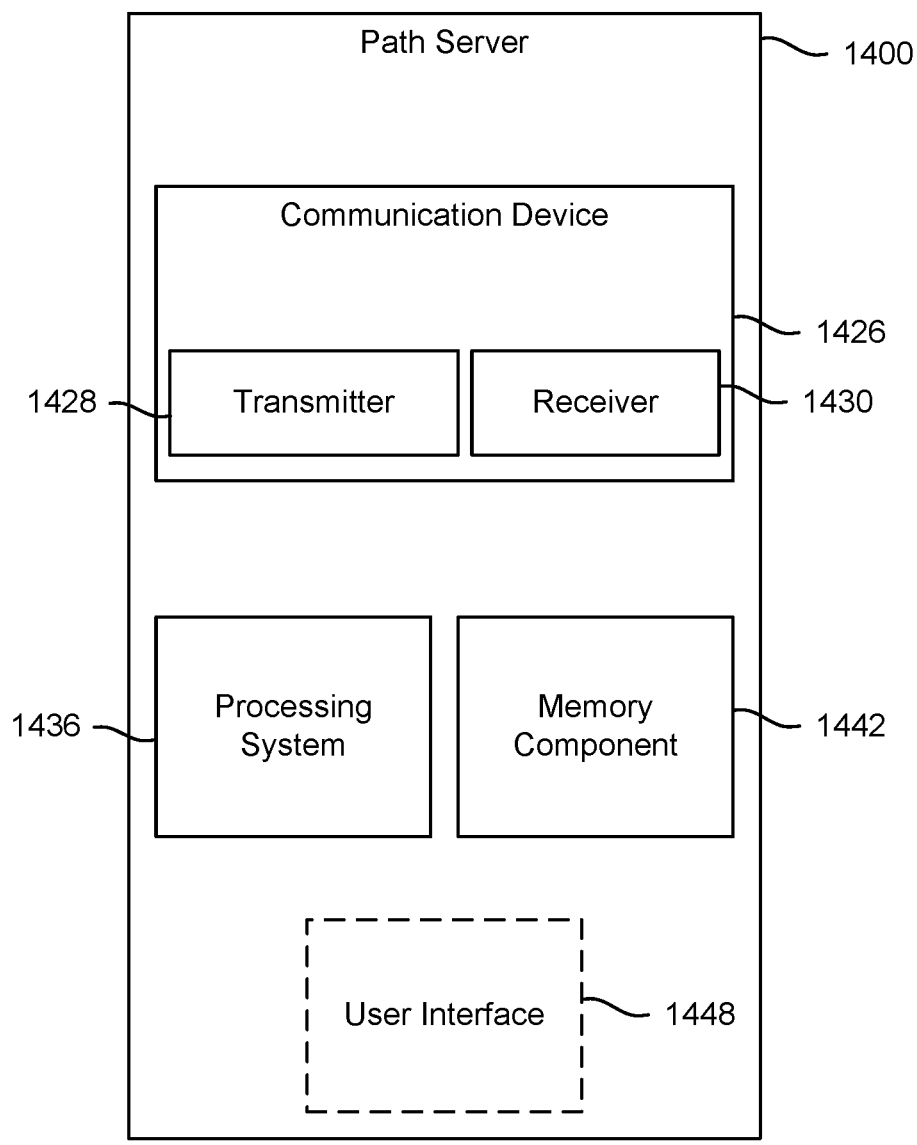
FIG. 14 illustrates an example path server device for implementing aspects of the disclosure represented as a series of interrelated components.

In some aspects disclosed herein the various functionalities disclosed may be implemented on any of a variety of commercially available server devices, such as server 1400 illustrated in FIG. 14. In an example, the server 1400 may correspond to one example configuration of the path server 750 described in the foregoing. Accordingly, in some examples, the path server 1400 includes at least one communication device (represented by the communication device 1426) for communicating with a network, such as a core network (e.g., NGC 210, EPC 260, etc.), a local area network coupled to other servers and/or to the Internet. For example, the communication device 1426 may comprise a network interface that is configured to communicate with one or more network entities via a wire-based or wireless backhaul. In some aspects, the communication device 1426 may be implemented as a transceiver configured to support wire-based or wireless signal communication. Accordingly, in the example of FIG. 14, the communication device 1426 is shown as comprising a transmitter 1428 and a receiver 1430. The various communications may involve, for example, sending and receiving: messages, data, instructions, parameters, or other types of information. In the various aspects disclosed, the path server is configured to communicate relay path information and relay cell lists, as discussed herein.

The path server 1400 includes a processing system 1436 and memory 1442 (e.g., each including at least one memory device). The memory 1442 may be volatile memory, a large capacity nonvolatile memory, such as a flash drive, solid state drive or disk drive or any combination thereof. In addition, path server 1400 may optionally include a user interface device 1448, for providing indications (e.g., audible and/or visual indications) to a user and/or for receiving user input (e.g., upon user actuation of a sensing device such as a keypad, a touch screen, a microphone, and so on). The various components illustrate in FIG. 14 may be configured according to the various examples described herein. It will be appreciated, however, that the illustrated blocks may have different functionality in different designs.

The components of FIG. 14 may be implemented in various ways. In some implementations, the components of FIG. 14 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a UE. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication comprising:
  receiving path information from a plurality of relays;
  compiling a relay cell list for an area of interest based on the received path information from the plurality of relays, the relay cell list indicating selectable relays in the area of interest; and
  providing the relay cell list to a user equipment (UE), wherein the area of interest is identified as a portion of a wireless communications network, wherein the providing the relay cell list to the UE comprises at least one of:
  providing the relay cell list to the UE, when the UE registers with the wireless communications network in the area of interest;
  providing the relay cell list to the UE, when the UE enters the area of interest due to a mobility event; or
  providing the relay cell list to the UE via a control plane provisioning function that is a policy control function (PCF) or network exposure function (NEF).

2. The method of claim 1, wherein the relay cell list for the area of interest is compiled based on geo-location information and time window information for the plurality of relays contained in the path information.

3. The method of claim 2, wherein the portion of the wireless communications network contains at least one donor base station that is capable of being connected to at least one of the plurality of relays during a time window.

4. The method of claim 1, further comprising:
  receiving a query from the UE, including a location and time of access to the area of interest for the UE, to request the relay cell list.

5. The method of claim 1, wherein at least one of the plurality of relays is located in a vehicle with a known path.

6. The method of claim 1, wherein the path information includes a plurality of geographic locations and associated time window for each of the plurality of relays with a corresponding relay cell operation configuration.

7. The method of claim 1, wherein the relay cell list includes at least one relay from the plurality of relays that is
  located in the area of interest during at least a portion of a time window; or
  expected to be located in the area of interest during at least a portion of a time window that is a future time.

8. A path server comprising:
  at least one processor coupled to a memory, the at least one processor configured to:
    receive path information from a plurality of relays;
    compile a relay cell list for an area of interest based on the received path information from the plurality of relays, the relay cell list indicating selectable relays in the area of interest; and
    provide the relay cell list to a user equipment (UE),
  wherein the area of interest is identified as a portion of a wireless communications network,
  wherein the at least one processor configured to provide the relay cell list to the UE is configured to perform at least one of:
    providing the relay cell list to the UE, when the UE registers with the wireless communications network in the area of interest;
    providing the relay cell list to the UE, when the UE enters the area of interest due to a mobility event; or
    providing the relay cell list to the UE via a control plane provisioning function that is a policy control function (PCF) or network exposure function (NEF).

9. The path server of claim 8, wherein the relay cell list for the area of interest is compiled based on geo-location information and time window information for the plurality of relays contained in the path information.

10. The path server of claim 9, wherein the portion of the wireless communications network contains at least one donor base station that is capable of being connected to at least one of the plurality of relays during a time window.

11. The path server of claim 8, wherein at least one of the plurality of relays is located in a vehicle with a known path.

12. The path server of claim 8, wherein the path information includes a plurality of geographic locations and associated time window for each of the plurality of relays with a corresponding relay cell operation configuration.

13. A method at a user equipment (UE) comprising:
  receiving a relay cell list for an area of interest from a path server, wherein the relay cell list is based on path information from a plurality of relays;
  searching for a relay based on information contained in the relay cell list; and
  selecting the relay based on information contained in the relay cell list,
  wherein the area of interest is identified as a portion of a wireless communications network,
  wherein the relay cell list is provided to the UE from the path server based on at least one of:
    the relay cell list being provided to the UE, when the UE registers with the wireless communications network in the area of interest;
    the relay cell list being provided to the UE, when the UE enters the area of interest due to a mobility event; or
    the relay cell list being provided to the UE via a control plane provisioning function that is a policy control function (PCF) or network exposure function (NEF).

14. The method of claim 13, further comprising:
  querying the path server to request the relay cell list.

15. The method of claim 14, wherein the querying comprises at least one of:
  querying using an Internet connection;
  querying using a control plane query function; or
  discovering the path server using a fully qualified domain name (FQDN) for the path server.

16. The method of claim 13, further comprising:
  requesting an updated relay cell list.

17. The method of claim 16, wherein the updated relay cell list is requested based on at least one of:
  the UE performing a handover to new base station;
  an elapsed time since receiving the relay cell list; or
  the UE being unable to connect to any of the relays listed in the relay cell list.

18. A method at a relay comprising:
  determining path information for the relay, wherein the path information includes a plurality of geographic locations and associated times with a corresponding relay cell operation configuration;
  providing the path information for the relay to a path server;
  determining updated path information for the relay; and
  providing the updated path information for the relay to the path server,
  wherein the determining the updated path information is triggered based on at least one of:
    determination of a deviation beyond a threshold from the path information provided to the path server;
    a status of the relay;
    an elapsed time since providing the path information; or
    a request from the path server.

19. The method of claim 18, wherein the deviation includes at least one of a deviation of geographic location or associated time from the path information provided.

20. The method of claim 18, wherein determining the path information is based on at least one of:
  a navigation system, or
  a pre-determined route.

21. The method of claim 18, wherein the path information is provided to the path server via at least one of:
  a Uu connection and a base station; or
  a sidelink connection to roadside unit (RSU).

* * * * *